US008805409B2

(12) United States Patent
Akiyama et al.

(10) Patent No.: US 8,805,409 B2
(45) Date of Patent: Aug. 12, 2014

(54) USING WIRED ENDPOINTS TO DETERMINE POSITION INFORMATION FOR WIRELESS ENDPOINTS IN A NETWORK

(71) Applicant: International Business Machines Corporation, Armonk, NY (US)

(72) Inventors: Kazuhito Akiyama, Toyko (DE); Shinkichi Hamada, Kanagawa (JP); Makoto Kogoh, Kanagawa (JP); Yasutaka Nishimura, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/629,472

(22) Filed: Sep. 27, 2012

(65) Prior Publication Data
US 2013/0084887 A1 Apr. 4, 2013

(30) Foreign Application Priority Data
Oct. 3, 2011 (JP) ................................. 2011-219205

(51) Int. Cl.
*H04W 88/02* (2009.01)
(52) U.S. Cl.
USPC ..................................................... 455/456.1
(58) Field of Classification Search
USPC ........ 455/456.1; 709/225, 238; 370/352, 400; 340/9.14; 375/224
See application file for complete search history.

(56) References Cited

U.S. PATENT DOCUMENTS

| 5,343,400 A | 8/1994 | Ishikawa |
| 5,535,336 A * | 7/1996 | Smith et al. .................. 709/225 |
| 7,856,234 B2 | 12/2010 | Alizadeh-Shabdiz et al. |
| 7,966,036 B2 | 6/2011 | Kojima |

(Continued)

FOREIGN PATENT DOCUMENTS

| JP | 2002186012 | 6/2002 |
| JP | 2007104245 | 4/2007 |

(Continued)

OTHER PUBLICATIONS

Oka, et al.,"Test of dedicated wireless LAN access points in position identifying infrastructure and evaluation of position accuracy control", [online], Mar. 2, 2011, Information Processing Society of Japan, [retrieved on May 27, 2011], Internet http: //www.ipsj.or.jp/10jigyo/taikai/73kai/73program/data/.

(Continued)

*Primary Examiner* — Diane Mizrahi
(74) *Attorney, Agent, or Firm* — David W. Victor; Konrad, Raynes, Davda and Victor LLP

(57) ABSTRACT

Provided are a computer readable recording media, system, and method for using wired endpoints to determine position information for wireless endpoints in a network. Identification information from a detected wired endpoint connected to the network is received and a command is issued to the detected wired endpoint to cause the detected wired endpoint to transmit signals identifying the wired endpoint. Information is received from a communicating wireless endpoint, comprising one of the wireless endpoints, using wireless communication, including wireless endpoint identification information and information identifying at least one of the wired endpoints transmitting signals received at the wireless endpoint. Position information is determined for the wired endpoint indicated in the information received from the communicating wireless endpoint. Information on the communicating wireless endpoint is updated to associate with the determined position information.

23 Claims, 16 Drawing Sheets

| Terminal Name | Building | Floor | Area | Block |
|---|---|---|---|---|
| Mobile Terminal 2 | Tokyo | 16F | East | |
| ••• | ••• | ••• | ••• | ••• |
| ••• | ••• | ••• | ••• | ••• |
| ••• | ••• | ••• | ••• | ••• |

(56) References Cited

U.S. PATENT DOCUMENTS

| | | |
|---|---|---|
| 8,019,357 B2 | 9/2011 | Alizadeh-Shabdiz et al. |
| 8,310,341 B2 * | 11/2012 | Cornwall et al. ............. 340/9.14 |
| 8,315,251 B2 * | 11/2012 | Ravindranath et al. ....... 370/352 |
| 8,355,406 B1 * | 1/2013 | Shimamoto .................. 370/400 |
| 8,374,228 B2 * | 2/2013 | Sanderford et al. .......... 375/224 |
| 8,379,835 B1 * | 2/2013 | Williams et al. ........... 379/266.1 |
| 2006/0123133 A1 * | 6/2006 | Hrastar ........................ 709/238 |
| 2007/0140191 A1 | 6/2007 | Kojima |
| 2008/0108371 A1 | 5/2008 | Alizadeh-Shabdiz et al. |
| 2011/0080841 A1 | 4/2011 | Alizadeh-Shabdiz et al. |
| 2011/0287783 A1 | 11/2011 | Alizadeh-Shabdiz et al. |
| 2013/0324165 A1 | 12/2013 | Fujiwara et al. |

FOREIGN PATENT DOCUMENTS

| | | |
|---|---|---|
| JP | 2007166464 | 6/2007 |
| JP | 4113219 | 7/2008 |
| JP | 2008288727 | 11/2008 |
| JP | 2010509571 | 3/2010 |
| JP | 4558639 | 10/2010 |
| JP | 2011164359 | 8/2011 |

OTHER PUBLICATIONS

Iwaya et al., "GOMASHIO : Model for Propagating Location Information in Sensor Networks" dated Nov. 15, 2001, [online], retrieved from the Internet on May 27, 2011, http: //ci.nii.ac.jp/naid/110002937796>, pp. 1-8.

Sato et al., "Estimation of Mobile Nodes Position Considering Accuracy for Ad-Hoc Networks", dated Mar. 5, 2004, IPSJ SIG Technical Report, [online], retrieved from the Internet on May 27, 2011, at http//ci.nii.ac.jp/naid/110002664571>, pp. 1-8.

IBM Corporation, "A Method to Manage Uncertain Position for Mobile Devices Using Pseudo Access Points", dated 2011, Yamato Software Development Lab, pp. 1-14.

"Information Materials for IDS", dated Feb. 2012, pp. 1-4, 2012.

Machine Translation of JP2008-288727, published Nov. 27, 2008, pp. 1-32, 2008.

Machine Translation of JP2002186012, published Jun. 28, 2002, pp. 1-16, 2002.

Machine Translation of JP2007104245, published Apr. 19, 2007, pp. 1-29, 2007.

US publication 20070140191 is English Language counterpart to JP4558639, 2007.

US Patent 7,966,036 is English Language counterpart to JP4558639, 2006.

US publication 20070140191 is English Language counterpart to JP2007166464, 2007.

US Patent 7,966,036 is English Language counterpart to JP2007166464, 2006.

US Patent 7,856,234 is English Language counterpart to JP2010509571, 2007.

US Patent 8,019,357 is English Language counterpart to JP2010509571, 2010.

US Publication 2008108371 is English Language counterpart to JP2010509571, 2008.

US Publication 2011287783 is English Language counterpart to JP2010509571, 2011.

US Publication 2011080841 is English Language counterpart to JP2010509571, 2011.

US Publication 20130324165 is English Language counterpart to JP2011164359, 2013.

Machine Translation for JP2007-104418 (also published as JP4113219), pp. 1-19, 2007.

* cited by examiner

| Building | Floor | Area | Hub | Block |
|---|---|---|---|---|
| Tokyo | 15F | West | HUB-15FW-Port0 | 1-7,2-6,2-7,... |
| Tokyo | 16F | East | HUB-15FW-Port1 | 3-6,3-7,3-8,... |
| ... | ... | ... | ... | ... |
| ... | ... | ... | ... | ... |

FIG. 6

| MAC Address | Hub | Building | Floor | Area |
|---|---|---|---|---|
| 00-1F-AA-12-34 | HUB-15FW-Port0 | Osaka | 2F | East |
| ... | ... | ... | ... | ... |
| ... | ... | ... | ... | ... |

FIG. 7

| Terminal Name | Building | Floor | Area | Block |
|---|---|---|---|---|
| Mobile Terminal 2 | Tokyo | 16F? | East? | 1-1,1-2,1-3,... |
| Mobile Terminal 2 | Tokyo | 15F? | West? | 3-4,3-5,3-6,... |
| ... | ... | ... | ... | ... |
| ... | ... | ... | ... | ... |

FIG. 8

| MAC Address | Field Intensity |
|---|---|
| 00-1F-BB-56-78 | 90% |
| 00-2A-CC-11-22 | 70% |
| ... | ... |

| MAC Address | Hub | Building | Floor | Area |
|---|---|---|---|---|
| 00-1F-AA-12-34 | HUB-15FW-Port0 | Osaka | 2F | East |
| 00-1F-BB-56-78 | HUB-15FW-Port0 | Tokyo | 16F | East |
| ... | ... | ... | ... | ... |

FIG. 14

| Terminal Name | Building | Floor | Area | Block |
|---|---|---|---|---|
| Mobile Terminal 2 | Tokyo | 16F | East | |
| ... | ... | ... | ... | ... |
| ... | ... | ... | ... | ... |

USING WIRED ENDPOINTS TO DETERMINE POSITION INFORMATION FOR WIRELESS ENDPOINTS IN A NETWORK

CROSS-REFERENCE TO RELATED FOREIGN APPLICATION

This application is a non-provisional application that claims priority benefits under Title 35, United States Code, Section 119(a)-(d) from Japanese Patent Application entitled "POSITION DETECTION DEVICE, POSITION MANAGEMENT SYSTEM, POSITION DETECTION METHOD AND PROGRAM" by Shinkichi HAMADA, Kazuihito AKIYAMA, Makaoto KOGOH, and Yasutaka NISHIMURA, having Japanese Patent Application Serial No. 2011-219205, filed on Oct. 3, 2011, which Japanese Patent Application is incorporated herein by reference in its entirety.

BACKGROUND OF THE INVENTION

1. Field of the Invention

Provided are computer readable recording media, system, and method for using wired endpoints to determine position information for wireless endpoints in a network 2. Description of the Related Art Portable information communication endpoints such as mobile phones, smart phones, tablet PCs, and notebook PCs have proliferated, and many people now carry these information communication endpoints with them at all times. These information communication endpoints incorporate a Global Positioning System (GPS) function, and a number of services are provided using position information acquired using this GPS function. These services include the display of a map including a user's current location, as well as services directing a user to a desired location.

A technology is known in which the position information of a mobile endpoint is acquired on the basis of base station cell information and information obtained from GPS, and the position information is registered in a server using a long-distance wireless network such as Wideband Code Division Multiple Access (W CDMA), Personal Digital Cellular (PDC), or CDMA2000. However, the utilization cost of this technology is high, and indoor position measurements cannot be performed using GPS. It is also difficult to perform a position measurement that takes into account such factors as an office layout. Therefore, a technology is desired that can perform an indoor position measurement easily and inexpensively, and that can perform a position measurement while taking into account such factors as an office layout.

In recent years, wireless local area networks (LAN), which are one type of short-range wireless communication system, have become more widely used in the market. A technology has been proposed which uses a wireless LAN to easily and inexpensively acquire the position of an information communication endpoint.

A technology has also been proposed in which positioning access points are installed to improve the detection accuracy of position information using the strength of wireless LAN. In this technology, wireless LAN access points functioning only as position identifying infrastructure are installed in an indoor space where GPS cannot be used, and these wireless LAN access points only perform beacon transmissions required for positioning. By narrowing and refining the radio wave areas, detection accuracy can be improved at low cost.

A technology has also been proposed in which packets carrying position information from a known endpoint are transmitted in ad hoc mode as beacon packets over an ad hoc network, and the position of the endpoint is estimated, for example, from the number of hops it takes for the position information to reach the receiving mobile node. In this technology, an endpoint that has acquired its absolute position using GPS broadcasts its own position information to nearby endpoints, and an endpoint estimating its own position range estimates its own position range using the broadcast information and the number of hops from GPS to itself as parameters.

One technology that estimates distance using known radio waves is called the Received Signal Strength Indication (RSSI) method. In this method, the relationship between distance and field intensity attenuation is used to estimate the distance to a radio wave generating node from the field intensity of the radio waves received by an object estimating the distance (end point). This technology will now be explained with reference to FIG. 1.

In FIG. 1, a notebook computer PC1 serving as the end point is at coordinates representing a three-dimensional position (xEst, yEst, zEst), and four notebook computers PC2, PC3, PC4, PC5 generating radio waves near notebook computer PC1 are at coordinates (x1, y1, z1), (x2,y2,z2), (x3,y3, z3), and (x4,y4,z4), respectively. The distance of each notebook to notebook computer PC1 is r1, r2, r3, r4, respectively.

The actual field intensity from each of the notebook computers PC2-5 is measured by notebook computer PC1, and values p1, p2, p3, p4 are obtained. When this is expressed in relationship to distance, the diagram shown in FIG. 2 is obtained. FIG. 2 shows that field intensity is inversely proportional to distance.

In this method, the distance between the end point and a plurality of nodes is estimated, and, using the distances and the position information of each node, the three-dimensional position coordinates (xEst, yEst, zEst) of the end point can be calculated using the following system of equations.

$$\begin{cases} (x_{Est} - x_1)^2 + (y_{Est} - y_1)^2 + (z_{Est} - z_1)^2 = r_1^2 \\ (x_{Est} - x_2)^2 + (y_{Est} - y_2)^2 + (z_{Est} - z_2)^2 = r_2^2 \\ (x_{Est} - x_3)^3 + (y_{Est} - y_3)^2 + (z_{Est} - z_3)^2 = r_3^2 \\ (x_{Est} - x_4)^4 + (y_{Est} - y_4)^2 + (z_{Est} - z_4)^2 = r_4^2 \end{cases} \quad \text{Equation 1}$$

Another such technology is called the Time Difference of Arrival (TDoA) method. In this method, the time difference between a radio wave transmission time of a node generating radio waves and a radio wave reception time of an end point is measured, and the distance between them is calculated from the time difference and the transmission speed of the radio waves.

In the configuration shown in FIG. 1, time differences t1, t2, t3, t4 are determined from the times at which radio waves were transmitted from notebook computers PC2-5 and the times at which the radio waves were received by notebook computer PC1. When this is expressed in relationship to distance, the diagram shown in FIG. 3 is obtained. FIG. 3 shows that the time difference is proportional to distance.

In this method as well, the distance between the end point and a plurality of nodes is estimated, and, using the distances and the position information of each node, the three-dimensional position coordinates (xEst, yEst, zEst) of the end point can be calculated using the system of equations in Equation 1.

SUMMARY

Provided are a computer readable recording media, system, and method for using wired endpoints to determine position information for wireless endpoints in a network. Identification information from a detected wired endpoint connected to the network is received and a command is issued to the detected wired endpoint to cause the detected wired endpoint to transmit signals identifying the wired endpoint. Information is received from a communicating wireless endpoint, comprising one of the wireless endpoints, using wireless communication, including wireless endpoint identification information and information identifying at least one of the wired endpoints transmitting signals received at the wireless endpoint. Position information is determined for the wired endpoint indicated in the information received from the communicating wireless endpoint. Information on the communicating wireless endpoint is updated to associate with the determined position information.

BRIEF DESCRIPTION OF THE DRAWINGS

FIG. 6 is an embodiment of a position information database managed by the management server.

FIG. 7 is an embodiment of a PAP database managed by the management server.

FIG. 8 is an embodiment of an endpoint database managed by the management server.

FIG. 10 is an embodiment of PAP identifying information and measurement results transmitted to the management server.

FIG. 13 is an embodiment of an updated PAP database.

FIG. 14 is an embodiment of an updated endpoint database.

DETAILED DESCRIPTION

Figure 1:
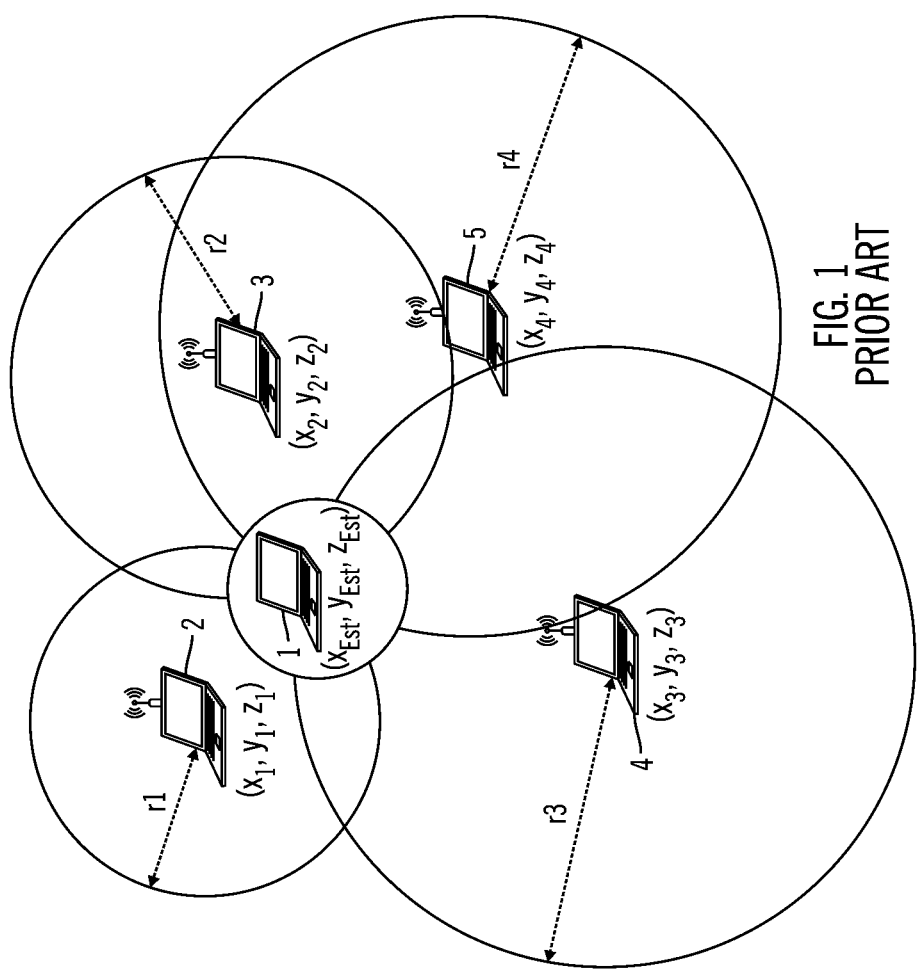
FIG. 1 illustrates a system configuration in which prior art technology for estimating positions using radio waves has been adopted.

In systems and methods described in the Description of the Related Art above using wireless LAN, endpoint devices, radio wave intercepting endpoints, and wireless LAN access points have to be arranged at the appropriate positions in advance, and position information has to be registered.

Also, when the position information of an end point is acquired using the RSSI method, the relationship between distance and radio field intensity attenuation has to be acquired and modeled in advance. In order to estimate a position as three-dimensional position coordinates, a minimum of three nodes is required, the three-dimensional position coordinates of these nodes have to be registered in advance, and this information has to be managed by each node.

When the position information of an end point is acquired using the TDoA method, a minimum of three nodes is required, the three-dimensional position coordinates of these nodes have to be registered in advance, and this information has to be managed by each node. In addition, time synchronization is required between each node and the end point.

Further, information communication endpoints at locations within the free address space of an office cannot be managed unless their position can be detected using a PAP. The positions of these information communication endpoints remain unknown.

Also, when few users connect to the wired LAN in their office and few information communication endpoints function as PAPs, few information communication endpoints can be used for position detection. Thus, most information communication endpoints cannot be detected and managed.

Further, if even the general position of these information communication endpoints can be detected so that all information communication endpoints communicating wirelessly can be managed, it would be possible to determine where people are congregating, and where there are no people. This could be reported to conserve electricity and adjust air conditioning to the appropriate level. Therefore, a device is desired that can easily detect the general position of all information communication endpoints communicating wirelessly, and that can readily and accurately manage all information communication endpoints.

In view of these problems, the described embodiments propose a technology in which position information for an information communication endpoint communicating wirelessly can be estimated without having to install in advance an appropriate number of endpoint devices in the appropriate positions and without having to register in advance position information for each of these endpoint devices.

In the described embodiments, when an information communication endpoint communicating wirelessly is connected to a wired LAN port in an office DHCP network environment, the location of the information communication endpoint such as the building, floor, and area where the information communication endpoint is located is identified from an IP address assigned by the DHCP server. The wireless LAN adaptor in the information communication endpoint is changed to ad hoc mode, and the information communication endpoint functions as a pseudo-access point (PAP).

An information communication endpoint communicating wirelessly whose position is to be determined receives radio waves generated by information communication endpoints functioning as PAPs, the field intensity is measured, and the results along with identification information identifying the PAPs are transmitted to a management server. The management server determines the closest PAP from the received results and identification information, and the location of the nearest PAP (building, floor, area) is used to estimate the location of the information communication endpoint communicating wirelessly.

The described embodiments provide a position detection device connected to a wired network for detecting the positions of a plurality of information communication endpoints communicating wirelessly via access points (AP). This device includes a command issuing unit for issuing a change command to an information communication endpoint connected to a wireless network within an AP range enabling communication via an AP to change the communication mode for direct wireless communication with another information communication endpoint so as to function as a pseudo-access point (PAP). The device further includes an information receiving unit for receiving endpoint identifying information from a plurality of information communication endpoints via an AP, and receiving from one or more first information communication endpoints among the plurality of information communication endpoints endpoint identifying information for each first information communication endpoint along with identifying information for each PAP within a first range able to receive from one or more PAPs generated carrier waves including PAP identifying information.

The device further includes a position detecting unit for referencing data associating position information with connection port identifying information for identifying a connection port of the wired network, acquiring position information for each PAP from the connection port identifying information for the connection port connecting each PAP, determining position information for each PAP corresponding to the identifying information for each PAP related to each first information communication endpoint as position information for each first information communication endpoint, and determining the position of one or more second information communication endpoints other than the first information communication endpoints in a second range outside of the first range but within the AP range as position information on the position of the second information communication endpoint, thereby detecting the positions of a plurality of information communication endpoints.

Further, in the case of a second information communication endpoint outside of a range (first range) able to receive carrier waves generated by a PAP, a second range outside of this range is detected as a position including a second information communication endpoint. When information communication endpoints connected to the wired network are added, the number of PAPs is increased, and the second range becomes narrower. Thus, the position of a second information communication endpoint can be detected with relatively good accuracy, and position detection is also easy as described above. As a result, a plurality of information communication endpoints communicating wirelessly can be managed easily and accurately.

In a further embodiment, when an information communication endpoint communicating wirelessly is connected to a wired network, the command issuing unit responds by issuing the change command mentioned above to the information communication endpoint, and the information communication endpoint functions as a new PAP. The position detecting unit treats an information communication endpoint in a third range able to receive the carrier waves generated by the new PAP as a first information communication endpoint, an information communication endpoint outside of the third range as a second information communication endpoint, and treats position information in a fourth range in which the third range has been excluded from the second range as position information on the position of a second information communication endpoint. This process is performed each time an information communication endpoint is newly connected to the wired network.

In a further embodiment, the device also includes a position notification unit for notifying a second information communication endpoint whose position cannot be detected by a PAP of position information in a second range determined to be the position information for the position of the second information communication endpoint, and prompts the information communication endpoint to enter its actual location. When entered position information is received, the information communication endpoint can be managed more accurately.

In a further embodiment, the AP range can be divided into a plurality of blocks in advance, and block information representing the first range in blocks can be included when an information communication endpoint is connected to each connection port to function as a PAP. By dividing the AP range into a plurality of blocks with a narrower range, positions can be detected and managed more easily and accurately. In this case, the position detecting unit references this data for second information communication endpoints, and treats the blocks constituting the AP range excluding those blocks constituting the first range as blocks constituting the second range.

In a further embodiment, to manage each information communication endpoint, the device manages a position information database storing data associating connection port identifying information, position information for connection ports and block information, an endpoint database storing data associating endpoint identifying information with at least position information, and a PAP database for data associating PAP identifying information with PAP position information. These databases can be incorporated into the device or located in an external unit. When located in an external unit, the databases can be connected to the device via a direct communication cable or a wired network.

The position detecting unit treats the endpoint identifying information of information communication endpoints functioning as PAPs as PAP identifying information, associates this information with PAP position information, and stores this information in the PAP database. When the field intensity of two or more carrier waves is measured by a first information communication endpoint, and the information receiving unit receives the measurement results along with PAP identifying information, the position detecting unit references the PAP database, specifies the PAP identifying information with the strongest carrier waves from two or more measurement results and PAP identifying information, and acquires the position information corresponding to the PAP identifying information.

The endpoint database stores position information acquired by the position detecting unit and associated with the endpoint identifying information of first information communication endpoints, and stores block information for the blocks constituting a second range determined by the position detecting unit and associated with endpoint identifying information for second information communication endpoints and with position information specified from the second range. This information is used to manage each information communication endpoint.

The endpoint database also includes block information for second information communication endpoints. When carrier waves can be detected by a newly functioning PAP, the position of the PAP can be detected as the position of the information communication endpoint. Here, the position is rewritten to the position information of the detected position, and block information stored as block information for blocks constituting the second range is deleted.

In a further embodiment, the command issuing unit issues change commands at regular time intervals so that information communication endpoints connected to the wired network function as PAPs. In this way, the positions of moving information communication endpoints can be updated, and the most up-to-date information can be managed.

In addition to a position detection device, the described embodiments also provide a position management system including this device and a plurality of information communication endpoints, and a position detection method executed by this device. This method includes processing steps performed by each of the units in the device. This method can be realized by a computer-readable program, and this program can be downloaded or provided on a recording medium.

Following is a description of the described embodiments with reference to the drawings. However, the present invention is not limited to the embodiments described below. Companies generally construct an in-house network environment by constructing a small-scale network within buildings using a LAN, and connecting this small-scale network to plants, branch offices and associated companies via the Internet, wide-area Ethernet, or Wide Area Network (WAN).

A position management system including the position detection device of the prior art and a plurality of information communication endpoints is preferably used in such an in-house network environment. (In the following description, information communication endpoints are referred to as endpoints, endpoints connected to the wired LAN are referred to as wired endpoints, and endpoints connected to the wireless LAN to communicate wirelessly are referred to as wireless endpoints.)

This system includes a plurality of endpoints, and a program called an agent program is installed in each endpoint. When the agent program has been executed, each endpoint functions as an agent means. In order to detect its own position using wireless communication, an agent means transmits PAP identifying information added to carrier waves, as described below, along with measurement results from measuring the field intensity of carrier waves, and its own endpoint identifying information. In order to detect the position of other endpoints communicating wirelessly, the agent means functions as a PAP which is described below.

In addition to receiving position information from a GPS receiver, the position detection device registers in advance but does not manage AP position information. The position detection device receives endpoint identifying information and at least PAP identifying information from wireless endpoints, detects the position of wireless endpoints using PAP identifying information, and issues commands to wired endpoints to function as PAPs. This position detection device registers and manages position information for PAPs and position information for wireless endpoints. Thus, in this embodiment, the position detection device is referred to as a management server.

First, the configuration of the position management system will be explained with reference to FIG. 4. The system configuration shown in FIG. 4 includes a management server 11 connected to a wired LAN 10, an AP 12, a wired endpoint 13, and wireless endpoints 14, 15 connected to the AP 12 via a wireless LAN and communicating wirelessly. A wired network may be constructed by connecting the management server 11, the AP 12, and the wired endpoint 13 to each other via network cables. Thus, in this position management system, additional hardware is not required other than that of the devices constituting a typical communication system including a management server 11, AP 12, endpoints 13-15, and a DHCP server 16.

A Dynamic Host Configuration Protocol (DHCP) server 16 is connected to the wired LAN 10 in order to create a DHCP environment in which Internet Protocol (IP) addresses are automatically assigned to devices connected to the wired LAN 10 as network addresses. The functions of the DHCP server 16 can be incorporated into the management server 11, and a separate DHCP server 16 can be omitted. Also, a DHCP server 16 does not have to be used if a DHCP network environment is not required.

Figure 4:
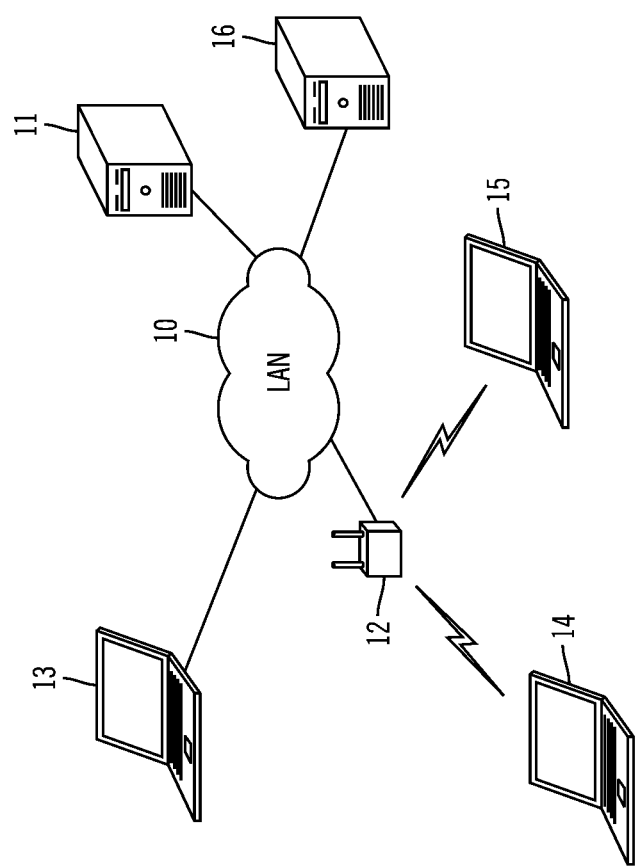
FIG. 4 is an embodiment of a configuration for a position management system including a management server functioning as a position detection device and a plurality of endpoints managed by the management server.

Only a single wired LAN 10 is shown in FIG. 4. However, a network configuration may be used in which a plurality of wired LANs are connected to each other via routers and the like, or a network configuration may be used in which they are connected to each other via a wide-area network such as the Internet. In order to connect endpoints to a wired LAN, a plurality of wired LAN ports are provided in each area of each floor in a building.

These wired LAN ports are connected to each other via a hub, which is a line concentrator in the wired LAN 10. Each wired LAN port can be identified by connection port identifying information used to identify connection ports, which have hub connection port numbers. A correspondence table is stored in the hub in which connection port numbers are associated with the endpoint identifying information, such as the Media Access Control (MAC) address, of an endpoint communicating using the connection port. In this configuration, the correspondence table is referenced to transmit data to the appropriate connection port.

The management server 11 manages an endpoint database for storing the position information of wireless endpoints, 14, 15, a position information database storing data associating connection port identifying information with the position information, and a PAP database for storing position information of wired endpoints 13 when a wired endpoint 13 has been set to PAP mode. These databases are used to detect the position of wireless endpoints, register their position information, and manage wireless endpoints 14, 15.

Figure 5:
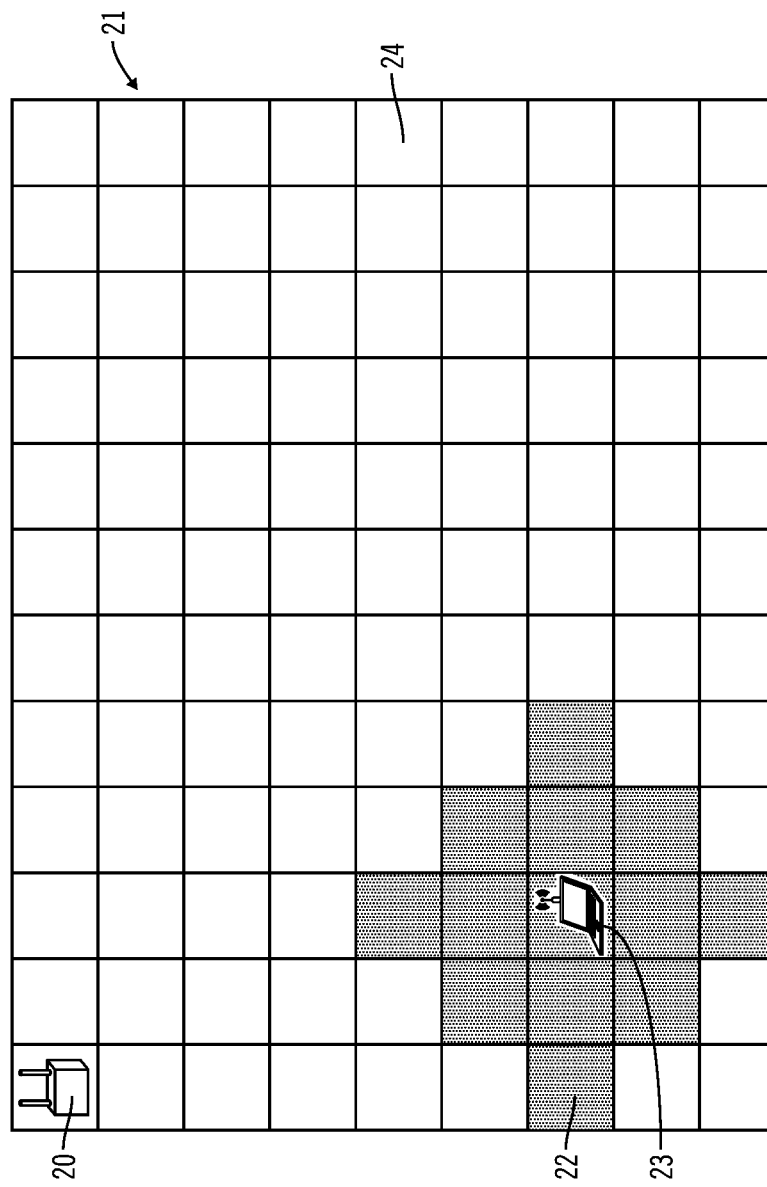
FIG. 5 is an embodiment of a range in which radio waves can be received from an endpoint functioning as a PAP.

FIG. 5 shows an AP range 21, which is a range reached by radio waves from AP 20, and is divided into a plurality of blocks 22. The AP range 21 receives radio waves, which are carrier waves, generated by PAP 23. The range 21 may be measured in advance or historical data is used to determine this range. Usually, AP range 21 is a range expressed by a circle centered on AP 20. However, in order to simplify the explanation, AP 20 is arranged in the upper left in FIG. 5, and AP range 21 is the range to the right and below AP 20.

In FIG. 5, the blocks in which the wireless endpoint is able to receive radio waves are shaded dark distinguish them from the other blocks in this range 21. AP range 21 is rectangular and divided into square blocks 22 whose sides are a given length. However, the described embodiments are not limited to this arrangement. Also, the range does not have to be divided into block units. It can also be divided into floor units.

This range can be a range in which radio waves can be received when the transmission output of the radio waves from the PAP 23 is 50%, or a range in which radio waves can be received by wireless endpoints with a sensitivity of 30% or more when the transmission output of the radio waves from the PAP 23 is 100%. This range can be determined as desired. The transmission output can be 60%, and the sensitivity can be 20% or more.

The block information in which this range is expressed using blocks is associated with connection port identifying information used to identify wireless LAN ports and stored in the position information database. Also, each block 22 can be assigned, for example, a numerical value as information identifying the block, and these numerical blocks can be used as block information.

More specifically, the block at the upper left in which the AP 20 is arranged is assigned the value 1-1 because it is in the first row and the first column. The block in which the PAP 23 is located is assigned 3-7, and the other blocks able to receive radio waves from the PAP 23 are assigned 1-7, 2-6, 2-7, 2-8, 3-5, 3-6, 3-8, 3-9, 4-6, 4-7, 4-8, and 5-7.

The position information database is configured as the table shown in FIG. 6 so that connection port identifying information and block information can be stored. Connection port fields are provided in the table for entering connection port identifying information, and block fields are provided for entering block information.

The positions of the wired LAN ports are determined in advance, and the connection port identifying information used to identify the wired LAN ports can be associated with position information such as buildings, floors, and areas with wired LAN ports. Therefore, the table can also have building fields for entering information identifying a building, floor fields for entering information identifying a floor of a building, and area fields for entering information identifying an area of a floor.

By including position information, the position information database can be used to specify the position of a wired endpoint 13 on the basis of the connection port identifying information corresponding to the wired LAN port to which the wired endpoint 13 is connected. In FIG. 6, the wired endpoint with connection port identifying information "HUB 15FW Port0" has block information "1-7, 2-6, 2-7, etc.", and indicates that the building name is "Tokyo", the floor number is "15F", and the area on the floor is "West".

The management server 11 can acquire the position information of the wired endpoint 13 by referencing the position information database. In other words, the management server 11 references the correspondence table of the hub to which the wired endpoint 13 is connected on the basis of the endpoint identifying information acquired from the wired endpoint 13, acquires the connection port identifying information corresponding to the endpoint identifying information of the wired endpoint 13, and then searches the position information database on the basis of the connection port identifying information to acquire the position information of the wired endpoint.

The management server 11 can issue a change command to the wired endpoint 13 to enable the endpoint to function as a PAP. At this time, the management server 11 associates PAP identifying information used to identify the PAP with the position information of the wired endpoint 13 acquired as a PAP in the manner described above, and stores this associated information in the PAP database.

The PAP database is configured as the table shown in FIG. 7, and is able to store PAP identifying information and position information. Therefore, the table is provided with MAC address fields for entering MAC addresses as PAP identifying information, and building fields, floor fields, and area fields for entering position information.

The position information database includes connection port identifying information in the position information, and the PAP database can also associate and store connection port identifying information. In the PAP database shown in FIG. 7, connection port fields are provided for entering connection port identifying information.

In FIG. 7, a wired endpoint with the MAC address "00 1F AA 12 34" is set as a PAP. This indicates that the wired endpoint is in the east area on the second floor of the Osaka building, and that it is connected to connection port number "Port0" of hub "HUB 15FW".

In FIG. 7, the MAC address is used to identify a wired endpoint functioning as a PAP. However, the endpoint name or both the endpoint name and the MAC address can be used. Also, the PAP database can associate and store block information. This can be used to specify a more specific location than the area. In other words, the block at the center of blocks constituting an area can be specified as the block in which the PAP is located.

The management server 11 receives radio waves transmitted by a wired endpoint 13 functioning as a PAP, and receives, for example, endpoint identifying information from a wireless endpoint 14, PAP identifying information for the PAP, and radio wave field intensity measurement results. In this way, the presence of the wireless endpoint 14 in the range able to receive radio waves from the PAP can be detected. When the wireless endpoint 14 can receive radio waves from a single PAP, the management server 11 does not have to receive measurement results measured by the wireless endpoint 14. Because there is no PAP adjacent to this PAP, the server does not have to determine which of a plurality of PAPs is closest using these measurement results.

When the management server 11 detects the presence of a wireless endpoint 14 in the range able to receive radio waves from a PAP, the presence of the wireless endpoint 14 in a position adjacent to the PAP is understood. The management server 11 assumes the position of the PAP is the position of the wireless endpoint 14, and stores the position information at the position of the PAP in the endpoint database as position information for the wireless endpoint 14. When this position information is stored, the management server 11 associates the position information with the endpoint identifying information of the wireless endpoint 14 and stores the associated information. Afterwards, the management server 11 manages the wireless endpoint 14 using the endpoint database.

The endpoint database is constituted as the table shown in FIG. 8, and this can be used to store position information for wireless endpoints. This table includes endpoint name fields for entering endpoint names as endpoint identifying information for identifying wireless endpoints, building fields, floor fields, area fields, and block fields. In FIG. 8, an example of position information entered for a wireless endpoint includes the endpoint name "Mobile Endpoint 2", the building name "Tokyo", the floor number "16F?", the area name "East?", and block information "1-1, 1-2, etc.".

Instead of an endpoint name, a MAC address uniquely identifying an endpoint can be used as endpoint identifying information. Both an endpoint name and a MAC address can also be used. In the present invention, because a wireless endpoint in a range able to receive radio waves from a PAP is also in a range other than this range from which it cannot receive radio waves, the position information for a range from which it cannot receive radio waves is stored as provisional position information in the endpoint database.

In FIG. 8, the question marks in "16F" and "East?" indicate that information is provisional position information. In this example, a question mark is used to indicate provisional position information. However, other symbols can also be used. It does not matter whether a symbol or a truth value from another field is used as long as the device can recognize provisional position information. Provisional position information is all floor and area information within an AP range able to receive radio waves from an AP that includes a range in which radio waves cannot be received from all PAPs within the AP range.

Because a position cannot be established, a question mark is added to two or more types of position information for "Mobile Endpoint 2", and the provisional information is stored as shown in FIG. 8. Afterwards, when position information is established by a newly functioning PAP, the provisional position information and block information is deleted and changed to the established position information, and the endpoint database is updated.

The process described above can be realized by a configuration including a storage device for storing an application for executing the process, a processor for reading the application from the storage device and executing the process, and a communication interface for connecting with the wireless LAN 10. Therefore, the management server 11 has a configuration including this storage device, processor, and communication interface.

The management server 11 stores the appropriate operating system (OS) in the storage device, and executes the application under control of the OS. The OS used here can be Windows (registered trademark), UNIX (registered trademark), LINUX (registered trademark), or MacOS (registered trademark).

Because the management server 11 has to register in advance the connection port identifying information, block information, and position information stored in the position information database, an administrator has to enter this information. Therefore, the management server 11 can also have an input device such as a keyboard, and a display device such as a display for confirming the entered information.

The AP 12 is connected to wired LANs 10. The AP 12 is used when wireless endpoints 14, 15 connect to each other, or when wireless endpoints 14, 15 communicate with the wired endpoint 13 or management server 11.

The AP 12 includes a receiver for receiving signals transmitted from the wireless endpoints 14, 15, a transmitter for transmitting signals to the wireless endpoints 14, 15 via wireless communication, and a communication interface for connecting to a wired LAN 10. The transmitter includes a modulation circuit for changing the amplitude, frequency and phase of radio waves, and for adding information to the radio waves. The receiver includes a demodulator for extracting information from received radio waves.

Endpoints 13-15 include a wireless LAN adaptor, which has two communication modes for establishing a wireless LAN connection: infrastructure mode and ad hoc mode. Infrastructure mode is the mode allowing endpoints to communicate with each other via the access point 12, and ad hoc mode is the mode allowing for direct communication between endpoints.

As in the case of the management server 11, the endpoints 13-15 also include a storage device, a processor, a communication interface, an input device, and a display device. It also includes a transceiver for establishing a wireless LAN connection with the AP 12 and another endpoint. The storage device stores various types of applications, data and agent programs, including the wireless LAN adaptor. The processor reads applications, data and agent programs from the storage device and executes them. The appropriate OS is stored in the storage device, and the processor executes the process under the control of this OS. The endpoints 13-15 can be a cell phone, smart phone, PDA, notebook PC or tablet PC.

An agent program is stored and delivered on a computer-readable recording medium such as a floppy disk, CR-ROM, DVD or SD card. The agent program can be read from the recording medium and installed on each endpoint. Also, the agent program can be installed in the management server 11 or an application server connected to the wired LAN or Internet, and read from the server and installed on each device.

The endpoints 13-15 can establish a wireless LAN connection with the AP 12 or another endpoint, and exchange information. Communication between endpoints can be performed using 2.4 GHz radio waves, and short-distance communication between endpoints over a few meters or several dozen meters can be performed using Bluetooth. Communication can also be performed using infrared communication or optical communication.

In order to group wireless LAN connections in a wireless LAN, a ServiceSetID (SSID) or ExtendedSSID (ESSID) can be used as identifying information. SSID is used during authentication. Thus, when SSIDs have been set in the AP 12 and endpoints 13-15, a connection cannot be established unless there is an SSID match.

Because wireless LAN communication is conducted over radio waves, there is a high risk of the content of the communication being intercepted by a third party. Therefore, as a security measure, communication can be conducted using a password known as a network key, or encrypted communication can be conducted using Wired Equivalent Privacy (WEP), Wi Fi Protected Access (WPA), WPA2 or IEEE 802.11i.

As in the case of the management server 11, the DHCP server 16 includes a storage device, a processor, a communication interface and, if necessary, an input device and a display device. The DHCP server 16 includes a range information database in which an IP address is assigned to a wired endpoint 13 connected to a wired LAN 10 on the basis, for example, of an IP address range for each area established in the range information database. In an environment in which wired LANs are connected to each other via a router, the DHCP server functions can be installed in the router, and IP addresses within a predetermined range can be assigned to each area.

When an endpoint 13 is connected to a wired LAN 10 using a LAN cable, the destination IP address is sent to the wired LAN 10, for example, a User Datagram Protocol (UDP) packet for broadcast with 255.255.255.255, in order to receive an assigned IP address. This UDP packet includes the MAC address of the sender. The DHCP server 16 receives this UDP packet, references the management table in which all leased IP addresses have been associated with the MAC addresses of lessees, the next IP address that has not been addressed is selected, the management table is updated, the selected IP address is transmitted on the basis of the MAC address, and the IP address is set in the endpoint 13 to assign it to the endpoint 13.

Figure 9:
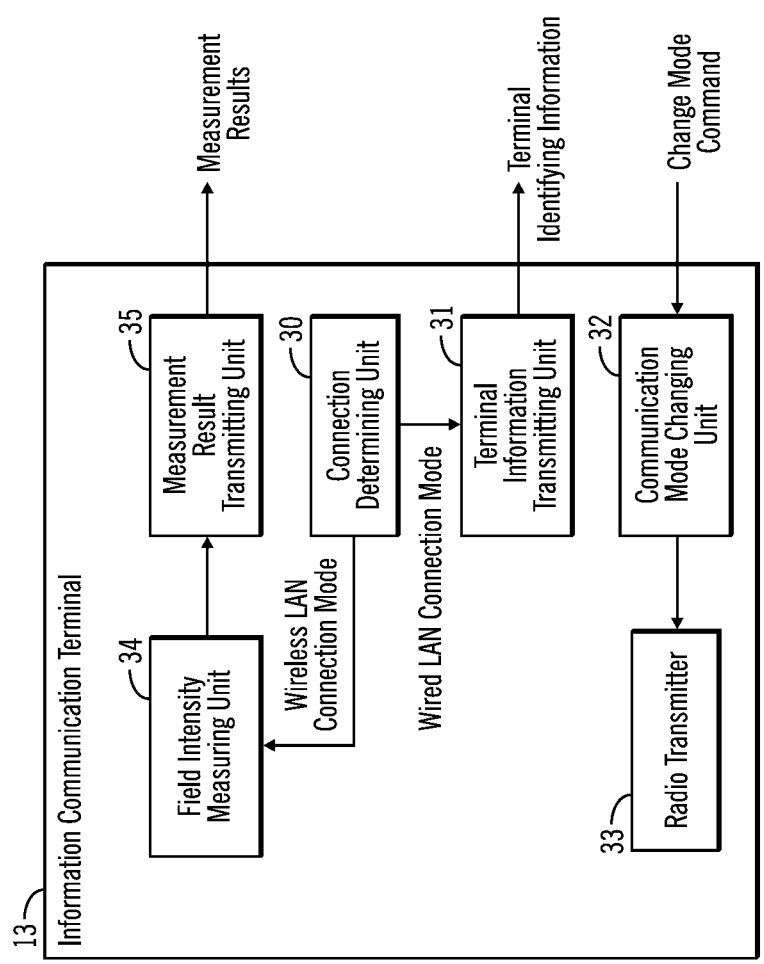
FIG. 9 is an embodiment of an endpoint.

Before explaining the management server 11 referred to as the position detection device of the present invention, the endpoints 13-15 used with this management server 11 will be explained briefly. FIG. 9 is a functional block diagram of the endpoint. Because all of the endpoints 13-15 have the same functions, only endpoint 13 will be explained. An agent program described above is installed in the endpoint 13. This agent program is stored in the storage device of the endpoint, and the endpoint functions as an agent means when the processor reads and executes the agent program.

An endpoint 13 serving as an agent means is configured to include a connection determining unit 30, an endpoint information transmitting unit 31, a communication mode changing unit 32, a radio transmitter 33 serving as a carrier wave generating unit, a field intensity measuring unit 34 serving as a strength measuring unit, and a measurement result transmitting unit 35. While not shown in FIG. 9, the agent means can also include if necessary a PAP mode determining unit for determining whether or not the PAP mode has been set.

The endpoint 13 can enable a wireless LAN connection by turning ON the wireless LAN adapter, and the wireless LAN connection can be disabled by turning OFF the adapter. The connection determining unit 30 verifies the network connection status of the endpoint 13 to determine whether or not a wired LAN connection has been established. After a LAN cable connection to a wired LAN port has been detected and until disconnection of the LAN cable is detected, the endpoint is set to wired LAN connection mode. Thus, the network connection status can be determined by verifying the connection mode. When the connection determining unit 30 has determined that the wireless LAN connection mode has been established and the wireless LAN adapter is still turned ON, the wireless LAN adapter is turned OFF so that a wireless LAN connection cannot be established.

The endpoint 13 is connected to a LAN cable, receives a connection to a wired LAN 10, and transmits a UDP packet described above to the DHCP server 16 to be allotted an IP address. The DHCP server 16 references the management table, selects an IP address that has not yet been leased, and allots the IP address to the endpoint 13.

After setting the IP address received from the DHCP server 16, the endpoint 13 executes the agent program and functions as an agent means. The endpoint information transmitting unit 31 of the agent means transmits endpoint identifying information including the endpoint name, IP address and MAC address to the management server 11 via the wired LAN 10. The endpoint information transmitting unit 31 uses the appropriate protocol such as TCP/IP to transmit the endpoint identifying information to the management server 11.

When the management server 11 has issued a change command to get the endpoint 13 to function as a PAP, the endpoint 13 receives the command, sets the ESSID in the wireless LAN adapter of the endpoint 13 for establishing a wireless LAN connection with the AP 12 to a specific ESSID which is recognizable as being allotted by an agent means, and the infrastructure mode is changed to the ad hoc mode. This allows other wireless endpoints to see the endpoint 13 operating as a PAP.

When the endpoint 13 has been set to function as a PAP, the radio transmitter 33 generates at a regular time interval radio waves to which the specific ESSID and endpoint identifying information such as the MAC address of the endpoint 13 have been added.

When another wired endpoint is functioning as a PAP, an ESSID different from that of the endpoint 13 is set as the specific ESSID, and radio waves are generated on a different timing. As a result, endpoints 14, 15 receiving the radio waves can synchronize with the transmission and reception timing of both radio waves.

When the connection determining unit 30 determines that there is no wired LAN connection, the endpoint 13 is a wireless endpoint just like the other endpoints 14, 15. As a result, the endpoint 13 keeps the wireless LAN adapter turned ON, and the field intensity measuring unit 34 measures the field intensity of radio waves generated by the radio transmitter in another endpoint functioning as a PAP.

A program for measuring field intensity is installed in the endpoint 13, and the executed program functions as the field intensity measuring unit 34. This field intensity measuring unit 34 can measure the field intensity of detectable radio waves generated by all endpoints with an ESSID allowing it to be recognized as a PAP. For example, the field intensity can be provided with a threshold value, and the field intensity measuring unit 34 measures only those radio waves with a field intensity greater than the threshold value.

Here, the configuration has a radio transmitter 33 and a field intensity measuring unit 34 to generate radio waves and measure their field intensity. However, the embodiments are not limited to this configuration. For example, ultrasonic waves or electromagnetic waves such as infrared light, visible light or ultraviolet light can be used as the carrier waves. An ESSID and endpoint identifying information can be added to these waves, and the intensity of the generated waves can be measured. Ultrasonic waves can be generated using a microphone and speaker.

The field intensity measured by the field intensity measuring unit 34 is sent along with the PAP identifying information of the PAP generating the radio waves and the endpoint identifying information of the endpoint 13 measuring the radio waves to a measurement result transmitting unit 35. At this time, the measurement result transmitting unit 35 transmits this information to the management server 11 via the AP 12 and the wired LAN 10.

An endpoint 13 functioning as a PAP generates radio waves towards a wireless endpoint 14. The wireless endpoint 14 measures the field intensity of the radio waves and transmits the measurement results shown in FIG. 10 to the management server 11 along with the PAP identifying information of the PAP and its own endpoint identifying information. FIG. 10 is a table including field intensity measurement results from an endpoint 13 set as a PAP with a MAC address of "00 1F BB 56 78" and another endpoint with a MAC address of "00 2A CC 11 22". Here, the field intensity of the radio waves received from endpoint 13 is 90%, and the field intensity of the radio waves received from the other endpoint is 70%.

An endpoint 13 functioning as a PAP is set to PAP mode. However, the field intensity of radio waves generated from the wireless LAN adaptor of an endpoint 13 set to the PAP mode is weaker than the field intensity of radio waves generated from the AP 12. As a result, the radio waves are greatly attenuated and their field intensity is faint even when passing through a concrete wall from a higher floor or lower floor.

However, radio waves from upper floors and lower floors are among those within the range in which field intensity is measured. In order to eliminate these radio waves, a threshold such as 30% sensitivity is provided, and any radio waves with a field intensity lower than the threshold value are eliminated. Only radio waves with a field intensity greater than the threshold value can be measured. The endpoint 13 generating radio waves with the greatest field intensity is nearest to the wireless endpoint 14 transmitting the measurement results. From this position, the general position of the wireless endpoint 14 can be detected.

Figure 11:
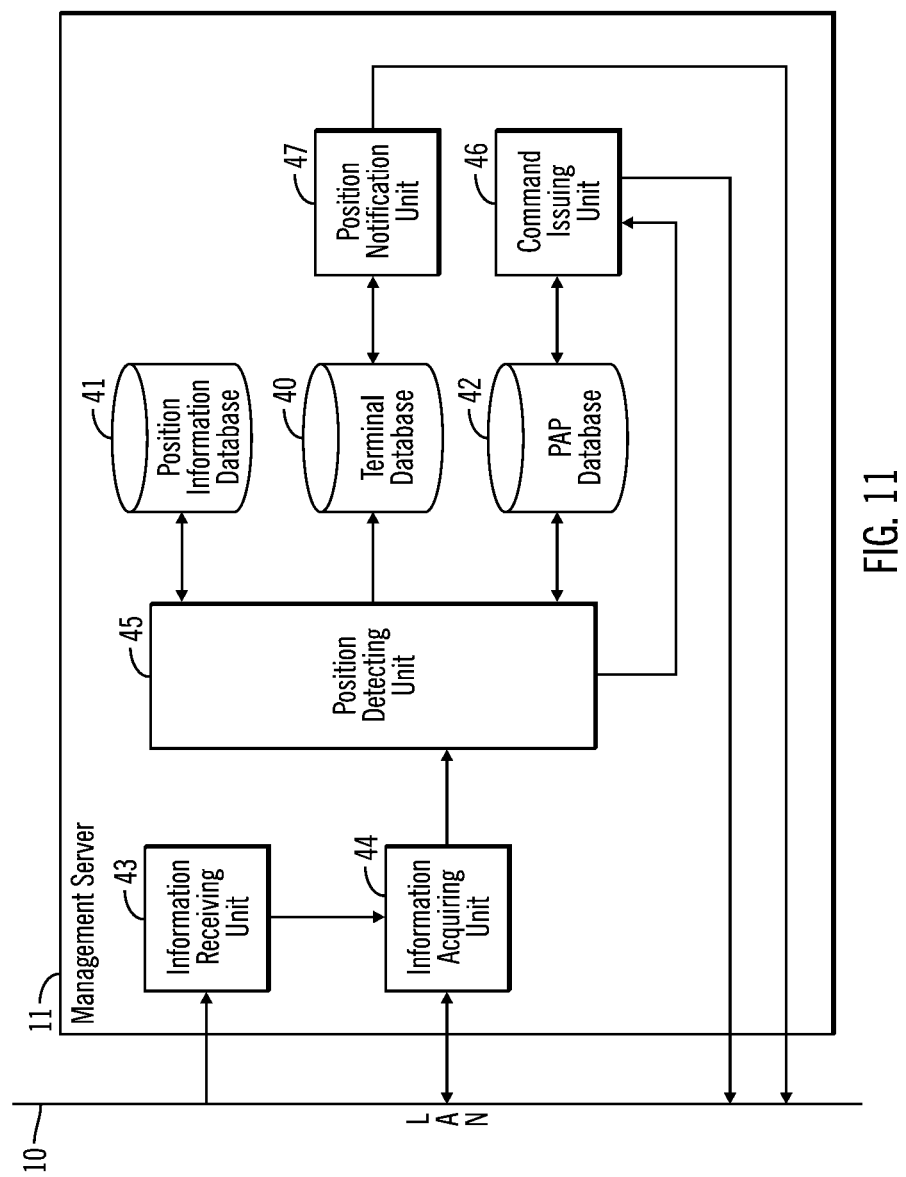
FIG. 11 is an embodiment of a management server.

The following is a detailed explanation with reference to FIG. 11 through FIG. 16 of the configuration of the management server 11 in the position management system shown in FIG. 4, and the processing performed by this management server 11. FIG. 11 is a functional block diagram of the management server 11. The management server 11 manages the databases shown in FIG. 6 through FIG. 8. These databases can be provided in a unit other than the management server 11 or can be installed in the management server 11. In the embodiment shown in FIG. 11, the databases are installed in the management server 11.

Here, the management server 11 is configured to include an endpoint database 40, a position information database 41 and a PAP database 42, as well as an information receiving unit 43, an information acquiring unit 44, a position detecting unit 45, a command issuing unit 46 and a position notification unit 47. As in the explanation with reference to FIG. 6 through FIG. 8, the endpoint database 40 associates the endpoint identifying information of the endpoints with the position information of the endpoints, and stores the associated information. The position information database 41 associates general location position information, connection port identifying information and block information, and stores the associated information. The PAP database 42 associates and stores endpoint identifying information of wired endpoints functioning as PAPs and the position information of these wired endpoints. These databases can be stored in a storage device such as a HDD in the management server 11.

The information receiving unit 43 is realized by the communication interface to receive information transmitted from the endpoints 13-15. The appropriate protocol such as TCP/IP is used to communicate with the wired endpoint 13, and the endpoint name, MAC address and IP address are used as the endpoint identifying information of the wired endpoint 13.

When a plurality of wired LANs are connected to each other via a router, the management server 11 is connected to one of these wired LANs, and the management server 11 communicates with a wired endpoint 13 via the router, the router performs routing of packets from the management server 11 using its own stored routing information, and the packets are transmitted to the target wired endpoint 13.

When the information receiving unit 43 receives endpoint identifying information from a wired endpoint 13, the information acquiring unit 44 is instructed to acquire connection port identifying information. The information acquiring unit 44 receives this instruction, contacts the hub serving as the line concentrator managing connection ports, and acquires from the hub the connection port identifying information corresponding to the endpoint identifying information. More specifically, the information acquiring unit 44 references a correspondence table stored in the hub, and acquires the connection port number corresponding to the MAC address included in the endpoint identifying information as the connection port identifying information.

When the connection port identifying information has been acquired, the information acquiring unit 44 sends the information to the position detecting unit 45 along with the endpoint identifying information. When this information is received, the position detecting unit 45 references the position information database 41, and acquires the position information of the wired endpoint 13 on the basis of the connection port identifying information. The position information is information such as the building name, floor and area.

Next, the position detecting unit 45 associates the acquired position information with the endpoint identifying information, and stores the associated information in the PAP database 42. It also instructs or permits a command issuing unit 46 to issue a change command. The stored information can include connection port identifying information in addition to the endpoint identifying information and position information. This information can also be stored in the endpoint database 40 or a second endpoint database provided separately. This is so that the position information of all wired endpoints can be managed.

When the command issuing unit 46 has received an instruction or permission from the position detecting unit 45, a change command is issued to change the wired endpoint 13 to ad hoc mode, which is the communication mode for direct wireless communication with other endpoints not via AP 12. In other words, the endpoint is commanded to function as a PAP. In FIG. 4, only one wired endpoint 13 is connected to the wired LAN 10. Because there are several wired endpoints in reality, a change command is issued one at a time to each wired endpoint. Preferably, these function as PAPs one at a time so that radio waves do not interfere with each other. However, some or all of the wired endpoints can simultaneously function as PAPs.

When the wired endpoints function as PAPs one at a time, the order can be determined by referencing the position information database 41 and PAP database 42, identifying the blocks of each wired endpoint from the block information of each wired endpoint, and activating the identified blocks in ascending order according to their assigned values.

When there are two numerical values to express the rows and columns as described above, the wired endpoints are activated in ascending order according to the numerical value for the column. When the numerical value of the column is the same, the wired endpoints are activated in ascending order according to the numerical value of the row. For example, when the blocks including wired endpoints A, B, C are "4-6", "3-7" and "10-3", respectively, change commands are issued in successive order to wired endpoints B, A and C.

When a plurality of wired endpoints simultaneously function as PAPs, the position information database 41 is referenced, the position of each wired endpoint is verified, a wired endpoint that does not experience interference is selected in a range capable of receiving radio waves from each wired endpoint, and a change command is issued to the selected wired endpoint.

Examples of the methods described above include a method in which the order of wired endpoints functioning as PAPs is determined, and a method in which wired endpoints functioning as PAPs are selected simultaneously from among wired endpoints. The present invention is not limited to these methods.

The command issuing unit 46 is not limited to this. For example, change commands can be issued to a determined wired endpoint or a selected endpoint in sequential order at a regular time interval such as a five-minute interval. This time interval can be selected at will. For example, a three-minute interval or ten-minute interval can be selected.

The change command issued by the command issuing unit 46 changes the communication mode of a wired endpoint set to the infrastructure mode to the ad hoc mode so that the wired endpoint functions as a PAP. This change command can be issued even when the wired endpoint has already been set to the ad hoc mode and the wired endpoint is functioning as a PAP. In this case, the wired endpoint receiving the command does not experience a mode change because it is already in the ad hoc mode.

In addition to a change command to the ad hoc mode described above, the command issuing unit 46 can issue a change command to change the communication mode of a wired endpoint set to the ad hoc mode to the infrastructure mode so that the wired endpoint no longer functions as a PAP. Thus, the command issuing unit 46 can switch a wired endpoint from PAP to non-PAP or from non-PAP to PAP at regular time intervals.

The command issuing unit 46 uses the appropriate protocol such as TCP/IP and uses the endpoint name, MAC address and IP address as the endpoint identifying information for at wired endpoint in order to transmit the issued change command to the wired endpoint.

When the wired endpoint receives a change command and changes modes to function as a PAP, the information receiving unit 43 receives field intensity measurement results transmitted from a wireless endpoint along with PAP identifying information for identifying the PAP. At this time, the information receiving unit 43 also receives the endpoint identifying information for the wireless endpoint transmitting the measurement results. The information receiving unit 43 sends the measurement results and the other information to the position detecting unit 45, and the position detecting unit 45 references the PAP database 42 on the basis of the measurement results and the PAP identifying information to detect the position of the wireless endpoint.

As mentioned above, the wireless endpoints either function one at a time as pseudo-access points or some or all of them function simultaneously as PAPs. In all cases, a wireless endpoint receives radio waves generated by each PAP if they can be received, and measures their field intensity.

When the information receiving unit 43 in the management server 11 receives measurement results measured by a wireless endpoint and transmitted along with endpoint identifying information and PAP identifying information, the measurement results and other information are sent to the position detecting unit 45. When the measurement results are for the field intensity of radio waves generated by two or more PAPs, the position detecting unit 45 identifies the PAP identifying information corresponding to the radio waves with the greatest field intensity, references the PAP database 42 on the basis of the PAP identifying information, and acquires the position associated with the PAP identifying information. The position detecting unit 45 treats the acquired position information as the position information of the wireless endpoint, associates this position information with the endpoint identifying information, and stores the associated information in the endpoint database 40.

Because wireless endpoints connected to a wireless LAN in AP range 21 shown in FIG. 5 exchange information wirelessly via AP 20, all of the wireless endpoints in AP range 21 can be identified. In other words, any wireless endpoint with endpoint identifying information in AP range 21 can be identified. This is because endpoint identifying information such as a MAC address is used to communicate wirelessly via AP 20. The information receiving unit 43 establishes communication via the AP 20 and acquires the endpoint identifying information via the AP 20.

When the range in which radio waves generated by PAPs covers AP range 21, the management server 11 can receive the measurement results and other information from all of the wireless endpoints in AP range 21, detect the position of each wireless endpoint from the measurement results and other information as mentioned above, and store the position information on their positions in the endpoint database 40.

However, when there are only a few wired endpoints in AP range 21 or the wired endpoints are concentrated in a specific location inside AP range 21, the positions of all wireless endpoints in AP range 21 cannot be detected in the manner described above.

The position detecting unit 45 uses the method described above to detect the positions of wireless endpoints from which it has obtained measurement results and other information. The positions of all other wireless endpoints are detected using the following method. In other words, the position detecting unit 45 references the position information database 41 and the PAP database 42, and determines the blocks in the AP range 21 that cannot receive radio waves from all of the PAPs.

Wireless endpoints from which the information receiving unit 43 of the management server 11 cannot receive measurement results and other information are in one of the blocks unable to receive radio waves. Therefore, these wireless endpoints can be managed if all of the blocks unable to receive radio waves are treated as position information in which there is a wireless endpoint. Thus, the position detecting unit 45 stores this position information in the endpoint database 40. At this time, an identifying symbol such as a question mark is added to the stored information so that it is understood to be provisional position information.

Figure 12A:
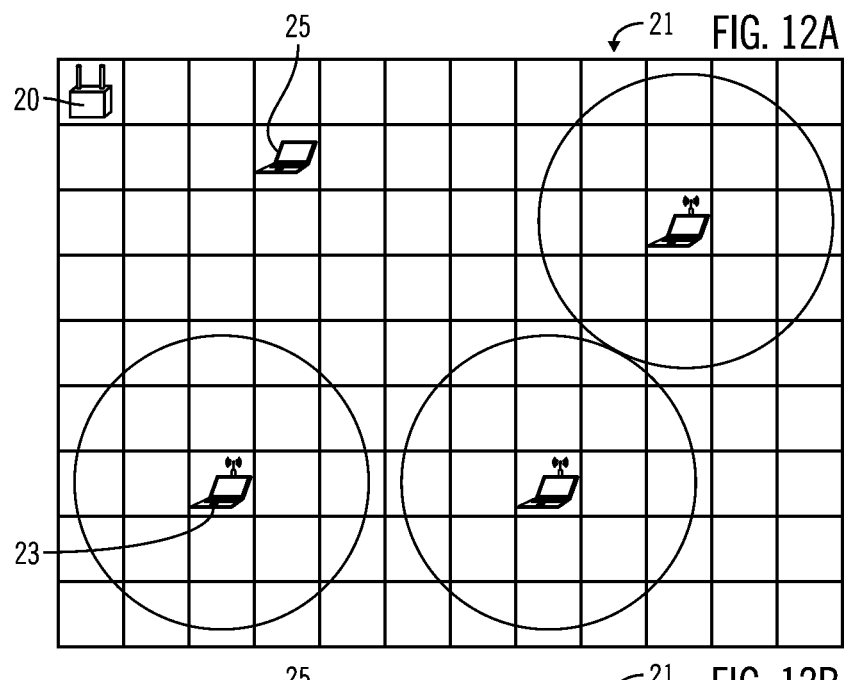
FIGS. 12a and 12b are embodiments embodiment of the ranges in which radio waves can be received from a PAP and the blocks within those ranges.
Figure 12B:
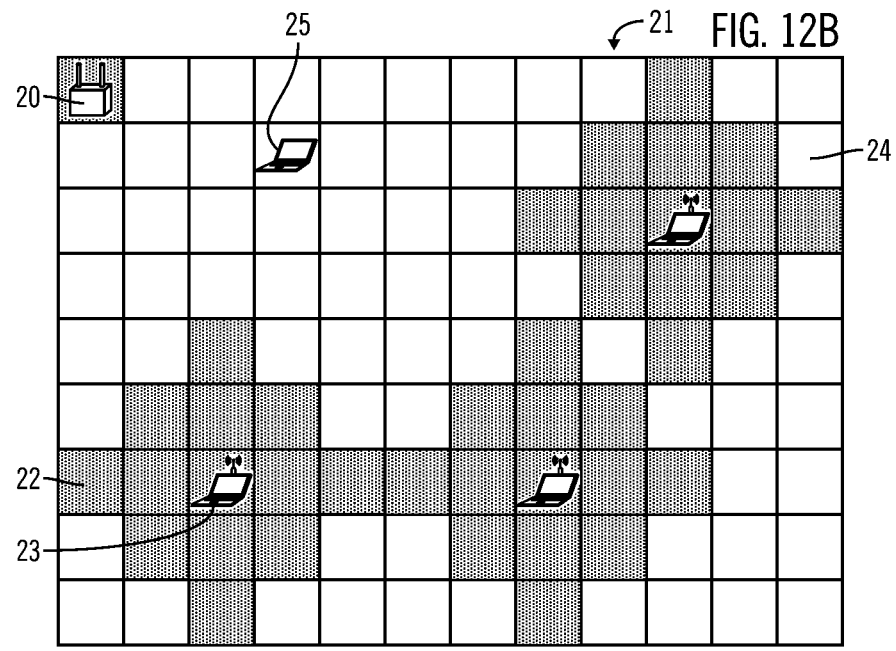

FIG. 12 (*a*) is a diagram using circles to indicate the ranges in which radio waves can be received from a PAP. FIG. 12 (*b*) indicates on the basis of FIG. 12 (*a*) the blocks within each circle that can receive radio waves from a PAP and the blocks outside of the circles that cannot receive radio waves from a PAP. FIGS. 12 (*a*) and 12(*b*) show the AP 20, PAPs 23, and a wireless endpoint 25. In FIG. 12 (*b*), the blocks in a range capable of receiving radio waves from a PAP are indicated in gray, and the blocks in a range unable to receive radio waves are indicated in white.

All of the blocks 24 indicated in white outside of the blocks 22 indicated in gray are blocks in a range unable to receive radio waves. All of these blocks 24 are treated as provisional position information for a single floor or area, and all of the provisional position information is stored in the endpoint database 40.

When a wireless endpoint is newly connected to a wired LAN port, the endpoint is allotted an IP address by the DHCP server 16, and endpoint identifying information such as the endpoint name and MAC address is transmitted to the management server 11. The information receiving unit 43 in the management server 11 receives this information, and instructs the information acquiring unit 44. The information acquiring unit 44 uses the endpoint identifying information to query the hub and acquire connection port identifying information such as a connection port number.

The information acquiring unit 44 in the management server 11 sends the endpoint identifying information and the connection port identifying information to the position detecting unit 45. The position detecting unit 45 references the position information database 41, acquires position information on the basis of the connection port identifying information, and instructs or allows the command issuing unit 46 to issue a command. The command issuing unit 46 issues a change command to the endpoint newly connected to the wired LAN so that the endpoint functions as a PAP. The endpoint executes the received change command, functions as a PAP, and transmits radio waves. The position detecting unit 45 treats the endpoint identifying information of the endpoint newly functioning as a PAP as PAP identifying information, associates this information with the acquired position information, as shown in FIG. 13, and stores the associated information in the PAP database 42.

When there is a wireless endpoint within a range capable of receiving radio waves from the new PAP, the wireless endpoint measures the field intensity and transmits the measurement results and other information to the management server 11. At this time, historical data on received measurement results can be referenced to determine whether or not the intensity of the radio waves generated by the new PAP are strong, even when the position information of the wireless endpoint has already been received. Because the wireless endpoint is usually considered to be in the same area, this determination is often considered unnecessary. However, because the wireless endpoint being located in a different area cannot be ruled out, this determination can be performed. When the field intensity of the radio waves generated by the new PAP is stronger, the position information of the PAP is acquired from the PAP database 42, and the endpoint database 40 is updated with this position information.

The position information of the wireless endpoint is stored in the endpoint database 40 as provisional position information. When the wireless endpoint is in a range capable of receiving radio waves from the new PAP owing to a wired endpoint newly functioning as a PAP, the management server 11 receives measured results and other information from the wired endpoint, and the position information of the new PAP is acquired from the PAP database 42. Then, the endpoint database 40 shown in FIG. 14 is updated with the position information. At this time, the provisional position information of the wireless endpoint in the endpoint database 40 and all of the block information is deleted. This is because the information is no longer necessary.

Figure 15:
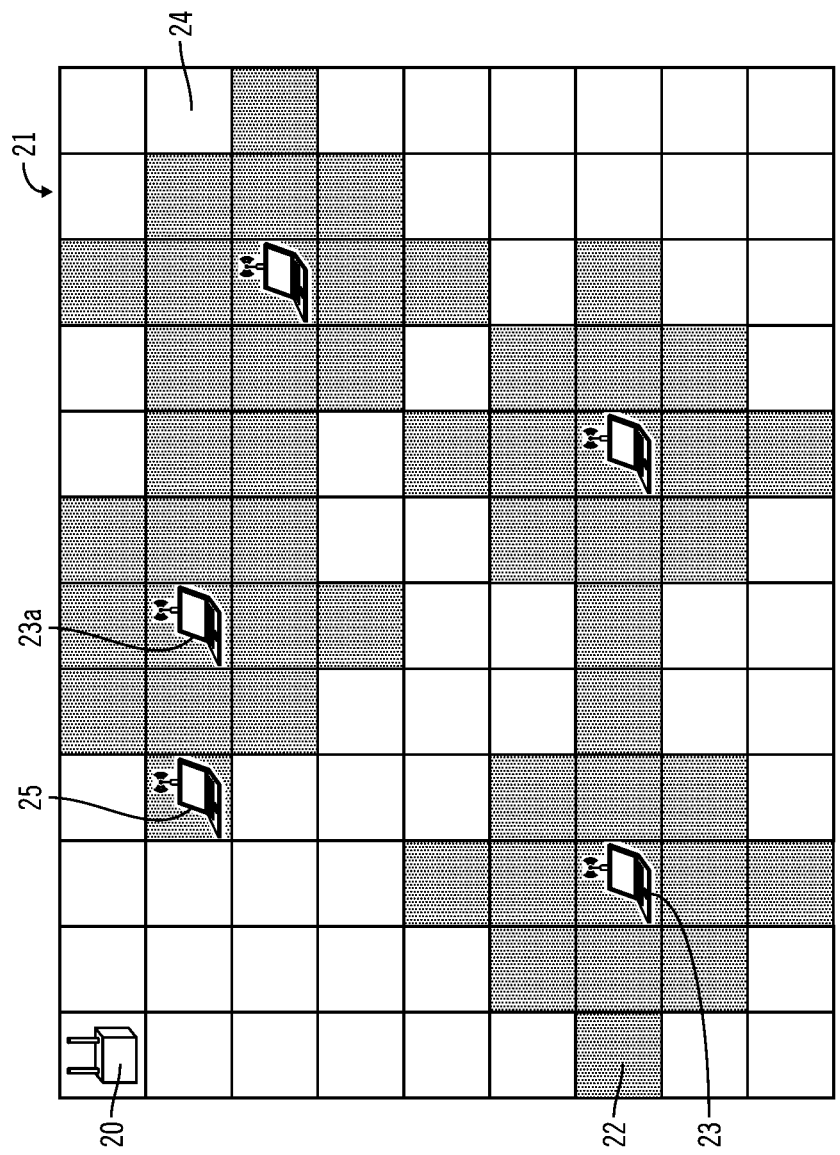
FIG. 15 is an embodiment showing locations in which the range capable of receiving radio waves has been expanded by additional PAPs.

When a PAP is added, the range capable of receiving radio waves from all of the PAPs 23 in AP range 21 is expanded as shown in FIG. 15. Therefore, the position detecting unit 45 deletes the block information for the blocks 22 constituting the range capable of receiving radio waves from all PAP 23 including the range capable of receiving radio waves from the new PAP 23a. The content of the endpoint database 40 is then changed to the block information for the remaining blocks 24 and the position information for a floor or area including these blocks.

The position notification unit 47 references the endpoint database 40, uses the endpoint identifying information of a wireless endpoint to notify the wireless endpoint registering provisional position information of the provisional position information, and prompts the user of the wireless endpoint to enter the actual location of the wireless endpoint. The notification of provisional position information can be transmitted as message or map data and displayed. Preferably, this is displayed on the screen of the wireless endpoint in a dialog box, or displayed in digital signage or in a map of the building management system.

The information acquiring unit 44, the position detecting unit 45, the command issuing unit 46 and the position notification unit 47 can be realized by having the processor read and execute a program stored in a storage device of the management system 11.

Figure 16:
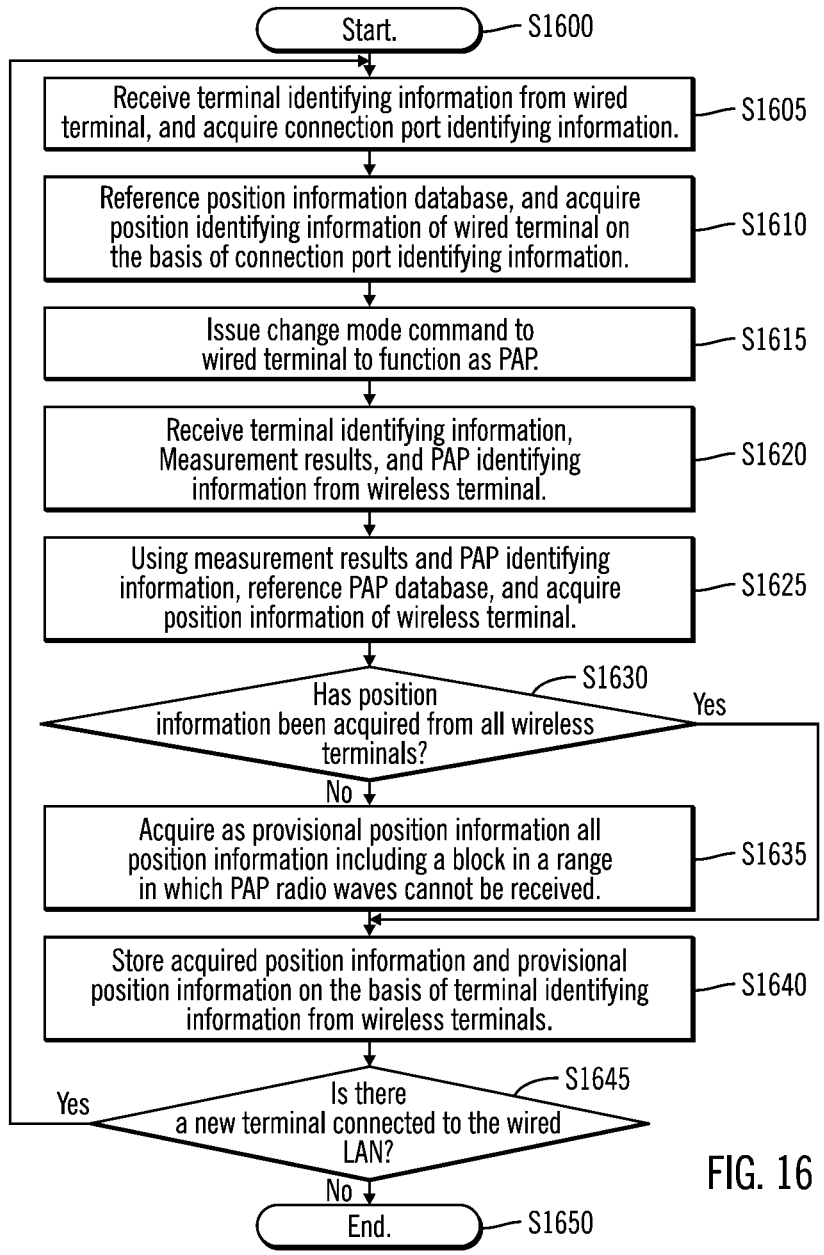
FIG. 16 is an embodiment of operations performed by the management server.

FIG. 16 is a flowchart showing the flow of processing performed by the management server 11. The process is started in Step 1600. In Step 1605, endpoint identifying information including an endpoint name, MAC address and IP address are received from a wired endpoint. Then, the information acquiring unit 44 references a correspondence table stored in the hub, and acquires connection port identifying information such as a connection port number. The information acquiring unit 44 sends this information to the position detecting unit 45.

In Step 1610, the position detecting unit 45 references the position information database 41, and acquires the position information of the wired endpoint on the basis of the connection port identifying information. Then, the position detecting unit 45 stores the acquired position information in the PAP database 42. As described above, this information can also be stored in the endpoint database 40 or a second endpoint database provided separately. Also, the position detecting unit 45 instructs or permits the command issuing unit 46 to issue a change command to the wired endpoint.

In Step 1615, the command issuing unit 46 receives an instruction or permission to issue a command from the position detecting unit 45, and issues a change instruction for the wired endpoint to function as a PAP. When the change command is received, the wired endpoint executes the command and switches the mode setting. Radio waves are then generated to communicate individually with another endpoint. A wireless endpoint in the range capable of receiving the radio waves measures the field intensity of the radio waves, and transmits the measurement results to the management server 11. PAP identifying information is added to the radio waves in order to identify the PAP. Thus, the wireless endpoint transmits to the management server 11 along with the measurement results PAP identifying information for identifying the PAP generating the radio waves and its own endpoint identifying information for identifying the wireless endpoint transmitting the measurement results.

In Step 1620, the management server 11 receives the measurement results and other information. In Step 1625, the received measurement results and other information are used to reference the PAP database 42 and acquire position information on the wireless endpoint. In Step 1630, it is determined whether or not position information has been acquired for all of the wireless endpoints. Here, all of the wireless endpoints means all of the wireless endpoints in AP range 21 in which wireless communication can be conducted via a single AP 20.

Because all of the wireless endpoints communicate via the AP 20 using endpoint identifying information, the information receiving unit 43 can communicate with the AP 20 and acquire the endpoint identifying information for all of the wireless endpoints. The process in Step 1630 described above can be executed using this endpoint identifying information. The process in Step 1630 can be performed by the position detecting unit 45, or a separate determination unit can be provided and the determination process performed by this determination unit.

When it has been determined that all of the information has not been acquired, the process advances to Step 1635. When all of the information has been acquired, the process advances to Step 1640. In Step 1635, the blocks in the range that are incapable of receiving radio waves from the PAP in the manner described above are determined, and all position information on the floor or area including these blocks is acquired as provisional position information.

In Step 1640, the acquired position information and provisional position information is stored as position information for each wireless endpoint in the endpoint database 40 along with the endpoint identifying information. At this time, the block information for these blocks is associated with the provisional position information and stored. Afterwards, in Step 1645, it is determined whether or not there is an endpoint newly connected to the wired LAN. If YES, the process returns to Step 1605, and the processing in Step 1605 through Step 1645 is repeated. If NO, the process advances to Step 1650 and the processing is ended.

Figure 2:
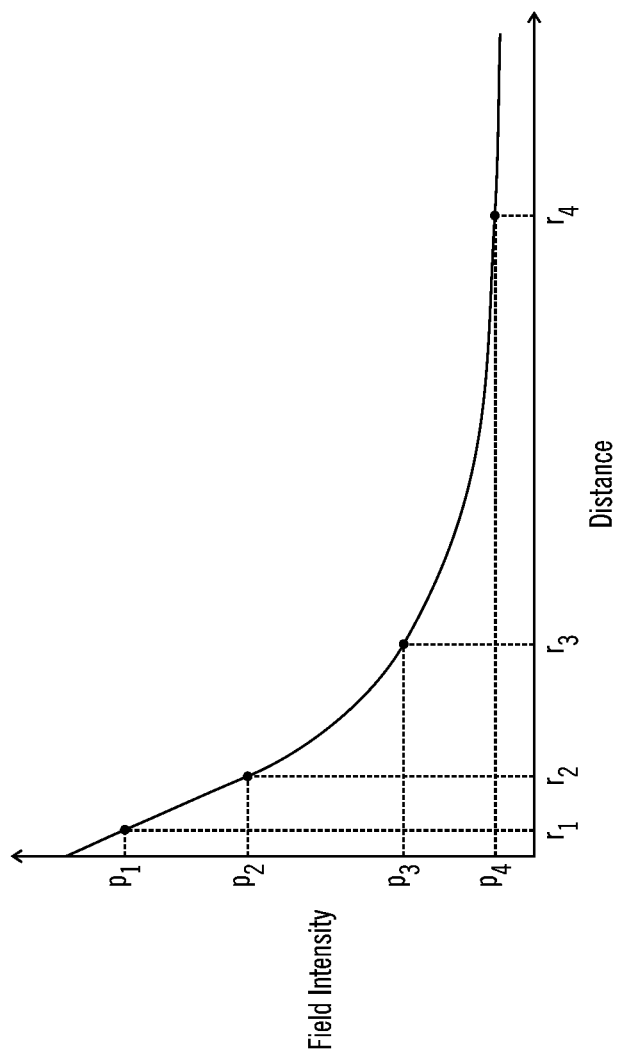
FIG. 2 illustrates a relationship known in the prior art between the field intensity received by an end point from each node and the distance from the end point to each node.
Figure 3:
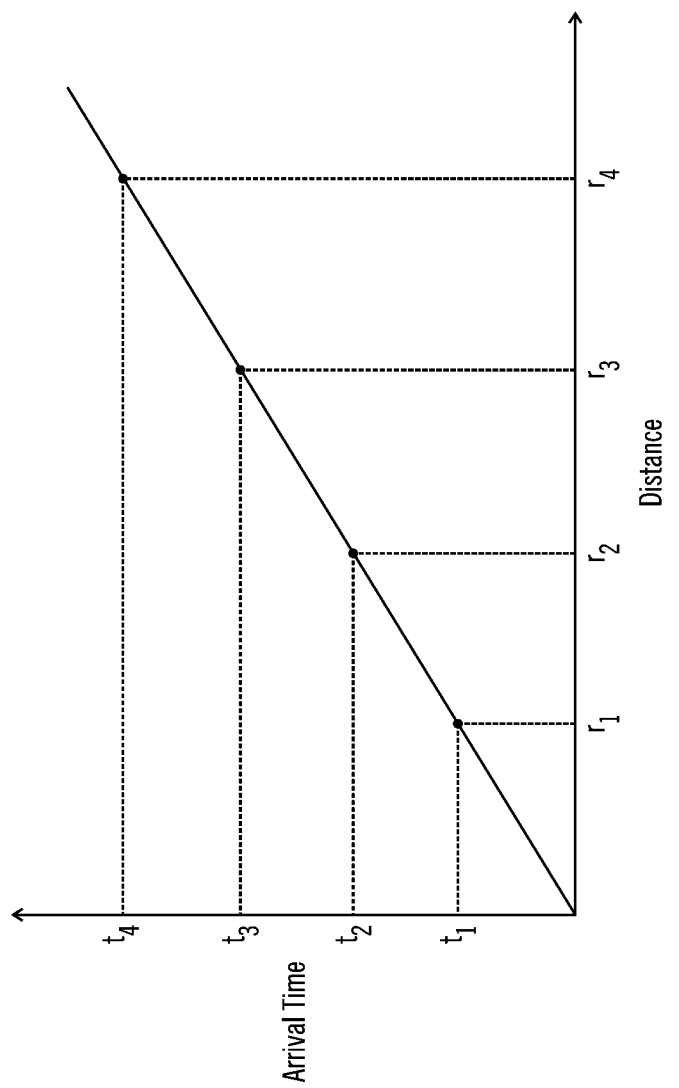
FIG. 3 illustrates a relationship between a difference separating a time radio waves were transmitted by each node from the time the radio waves were received by the end point, and the distance from the end point to each node.

If there is another AP range, this processing can be executed in that AP range. In this explanation, the measurement results are used to determine what PAP position information is being employed. However, the measurement results can also be used to calculate the distance from the PAP based on the relationship shown in FIG. 2, and to detect the block corresponding to this distance as the position of the wireless endpoint. In this way, the position can be detected more precisely.

The position notification unit 47 can notify the wireless endpoint in the range incapable of receiving radio waves from the PAP of the provisional position information determined by the position determining unit 45 as the position information for the position of the wireless endpoint, and can prompt the user of the wireless endpoint to enter the actual position of the wireless endpoint. An example of a screen on a wireless endpoint displaying provisional position information from the position notification unit 47 is shown in FIG. 17.

When radio waves cannot be received from a PAP on the basis of a policy such as when a certain amount of time has elapsed, the position notification unit 47 can reference the endpoint database 40, and use the position identifying information of the wireless endpoint to notify a wireless endpoint of provisional position information. In FIG. 17, a dialog box 50 is displayed in the notification range of the screen, and text is displayed in the dialog box 50 including a message asking the user to select the current location among two provisional positions and "other".

Figure 18:
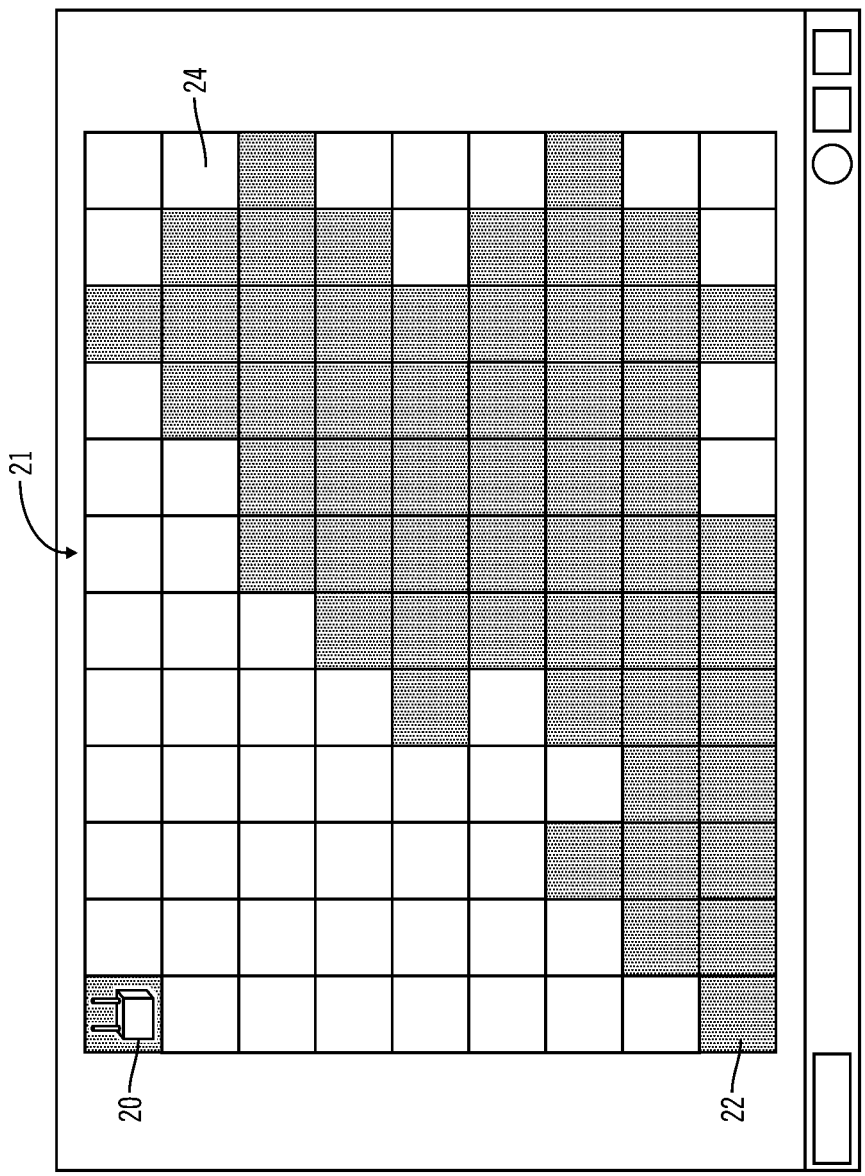
FIG. 18 is an embodiment of provisional position information displayed on the screen of the wireless endpoint.

FIG. 18 shows another example of a screen on a wireless endpoint indicating the provisional position information from the position notification unit 47. In FIG. 18, there is no text. A map of the AP range 21 is displayed which is divided into a plurality of blocks. The blocks 22 within the range capable of receiving radio waves from a PAP are indicated in gray, and the blocks 24 in the range incapable of receiving radio waves are indicated in white. AP 20 is also included in FIG. 18.

Figure 17:
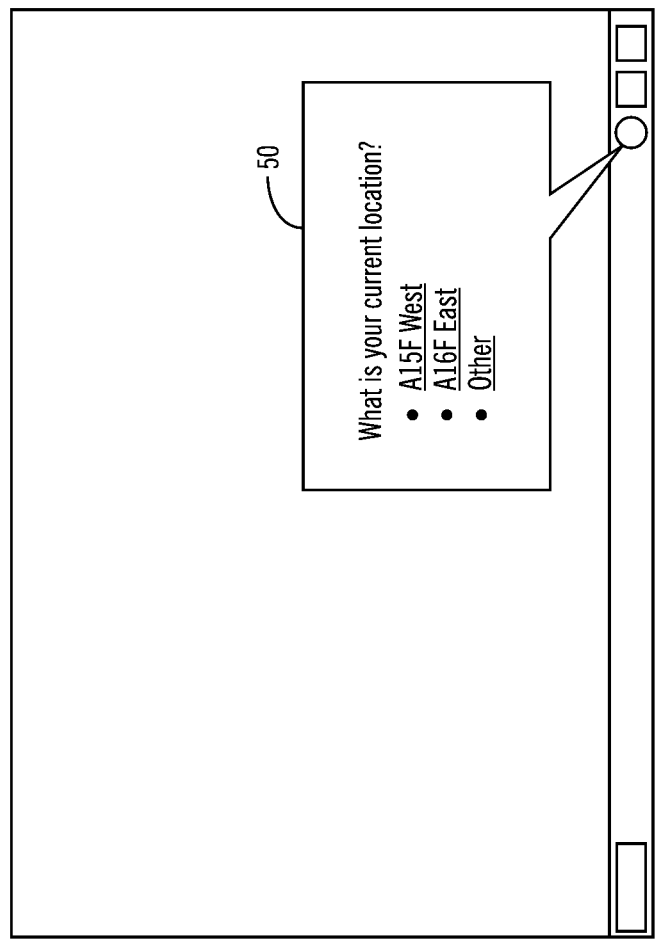
FIG. 17 is an embodiment of provisional position information displayed on a screen of a wireless endpoint.

When the screen in FIG. 17 is displayed, the user holding the wireless endpoint clicks or touches the appropriate location. When "other" is selected, actual position information can be entered and sent to the management server 11. The management server 11 receives this position information, and can change the provisional position information for the wireless endpoint in the endpoint database 40 to the received position information, and update the endpoint database 40.

When the screen in FIG. 18 is displayed, a block indicated in white as provisional position information can be selected to enter the actual position information, and the actual position information can be sent to the management server 11. Then, the endpoint database 40 can be updated in the same manner as above.

In FIG. 17 and FIG. 18, provisional position information is displayed as possible candidates for actual position information. However, this can also be displayed using text only. In FIG. 17 and FIG. 18, the content was from the notification unit. However, the present invention is not limited to this.

When the users of endpoints 13-15 have a meeting, they go to the meeting with the endpoints 13-15. Endpoint 13 is removed from the LAN cable, the mode is switched to wireless LAN connection mode, and the position of the endpoint changes. The positions of endpoints 14 and 15 also change.

However, the command issuing unit 46 in the position management system issues change commands at regular intervals, and performs the position detection process by getting wired endpoints to function as PAPs. As a result, the endpoint database 40 and the PAP database 42 are updated at regular intervals, and management can be performed with up-to-date information. The time interval can be set at will.

The position management system can detect the position of each endpoint and manage the endpoints easily and accurately even inside buildings that cannot be reached by radio waves from GPS satellites. As a result, described embodiments can be applied to services using various types of position information. When searching for a person, the position of the endpoint carried by the person can be easily detected, and the current location of the person can be identified.

Because of the problem of global warming, there have been calls in recent years for the conservation of electricity, and companies have also been pursuing the conservation of electricity. By detecting the positions of endpoints, it can be determined where there are currently no people, and electric lights can be turned off in those locations to conserve electricity. Also, air conditioning can be turned down and the number of fluorescent lamps providing lighting can be reduced in locations with few people to conserve electricity.

Because the present invention can detect the general location of all endpoints, it is possible to determine where people are congregating, and where there are no people. This can be reported to conserve electricity and adjust air conditioning to the appropriate level.

The radio waves transmitted from endpoints used as PAPs are not used for actual communication, so the field intensity can be set freely by the agent means. As a result, the field intensity of radio waves generated by PAPs can be reduced and attenuation due to walls and floors can be used so that wireless endpoints receive radio waves from PAPs on the same floor or in the same room. This can be used to more easily identify the floors and rooms in which wireless endpoints are located.

When an endpoint is connected to a wired LAN, a LAN cable is inserted into a wired LAN port. Because there are many endpoints connected to LAN cables on desktops, all of the PAPs can be assumed to be at the height (h) of the desktop when these endpoints are established as PAPs. As a result, it is easy to identify position information as two-dimensional coordinates with an x coordinate and a y coordinate. In the past, the field intensity was measured from four access points, and the system of four equations in Equation 1 had to be solved. However, because of the fixed height (h), the field intensity in the present invention can be measured from three PAPs, and a series of only three equations has to be solved in order to obtain accurate position coordinates.

When a wireless LAN connection is established, the wireless endpoint can be set to infrastructure mode to communicate via the existing wireless LAN network using AP. Existing hardware such as the wireless LAN adaptor in the endpoint is used, and wireless communication can be realized without adding any novel hardware. Because the positions of endpoints can be estimated from the position information of PAPs, the position information is registered in advance in the AP, and management operations are not required.

The position detection device, position management system, and position detection method of the present invention have been explained in detail above with reference to the drawings. However, other embodiments, additions, changes and subtractions are possible within the range of those conceivable by a person of skill in the art. Included in the scope of the present invention are any embodiment able to realize the operations and effects of the present invention.

Also, a computer-readable program can be provided to enable a computer to function as the position detection device and execute the position detection method. This program can be stored and delivered on a computer-readable recording medium such as a floppy disk, CD-ROM, DVD-ROM, SD card or HDD. The program can also be stored in an application server and delivered in response to a download request.

What is claimed is:

1. A computer readable recording medium including code executed by a processor to communicate with wired endpoints and wireless endpoints over a network and perform operations, the operations comprising:

maintaining information on the wired endpoints transmitting signals identifying the wired endpoints and including position information for the wired endpoints;

receiving identifying information from a detected wired endpoint connected to the network;

issuing a command to the detected wired endpoint to cause the detected wired endpoint to transmit signals identifying the wired endpoint;

receiving information from a communicating wireless endpoint, comprising one of the wireless endpoints, using wireless communication, including wireless endpoint identification information and information identifying at least one of the wired endpoints transmitting signals received at the wireless endpoint;

determining position information for the wired endpoint indicated in the information received from the communicating wireless endpoint; and updating information on the communicating wireless endpoint to associate with the determined position information.

2. The computer readable recording medium of claim 1, wherein the wired endpoints are connected to connection ports on the network, wherein the operations further comprise:
   determining from the connection port to which the detected wired endpoint is connected position information of the connection port; and
   updating the information on the detected wired endpoint for which the identifying information is received to associate with the determined position information for the connection port.

3. The computer readable medium of claim 2, wherein the operations further comprise:
   maintaining a position information database associating the connection ports with position information, wherein the position information database is accessed to determine the position information of the connection port;
   maintaining a wired endpoint database associating the wired endpoints with the position information for the wired endpoints, wherein the wired endpoint database is accessed to determine the position information for the wired endpoint indicated in the information from the wireless endpoint; and
   maintaining an endpoint database associating wireless endpoints and the determined position information for the wireless endpoints.

4. The computer readable recording medium of claim 1, wherein the detected wired endpoint comprises one of the wireless endpoints for which position information is maintained.

5. The computer readable recording medium of claim 1, wherein the communicating wireless endpoint comprises a first wireless endpoint, wherein the operations further comprise:
   receiving identification from a second wireless endpoint, comprising one of the wireless endpoints, that does not identify at least one of the wired endpoints for which information is maintained;
   determining position information for positions outside of a range in which the transmitted signals from the wired endpoints are receivable; and
   updating information on the second wireless endpoint to associate with the determined position information outside of the range in which the transmitted signals from the wired endpoints are not receivable.

6. The computer readable recording medium of claim 5, wherein the wireless endpoints including the first and second wireless endpoints communicate within an access point range defined by an access point device, and wherein the wired endpoints are configured to operate as pseudo access points (PAPs), wherein the PAPs transmitted signals are receivable within PAP ranges within the range defined by the access point device, and wherein the position information outside of the range in which the transmitted signals from the PAPs are not receivable are within the access point range and outside of the PAP transmission ranges.

7. The computer readable medium of claim 5, wherein the operations further comprise:
   sending a notification to be rendered at the second wireless endpoint prompting a user to indicate actual position information of the second wireless endpoint;
   receiving, in response to the notification, user entered actual position information; and
   updating the information for the second wireless endpoint to associate with the received user entered actual position information.

8. The computer readable medium of claim 1, wherein the information received from the communicating wireless endpoint includes measurement results from measuring a field intensity of received transmitted signals from the wired endpoints, wherein the operations further comprise:
   determining from the measurement results one of the wired endpoints transmitting at a strongest intensity, wherein the determined position information of the wired endpoint associated with the communicating wireless endpoint comprises the position information from the wired endpoint transmitting at the strongest intensity.

9. The computer readable medium of claim 1, wherein the operations further comprise:
   using information on the wireless endpoints to determine locations where wireless endpoints are congregating and where there are no wireless endpoints; and
   using information on the determined locations where wireless endpoints are congregating and where there are no wireless endpoints to adjust electricity supplied to the determined locations to conserve electricity.

10. A system in communication with wired endpoints and wireless endpoints over a network comprising:
   a processor;
   a computer readable recording medium including code executed by the processor to perform operations, the operations comprising:
      maintaining information on the wired endpoints transmitting signals identifying the wired endpoints and including position information for the wired endpoints;
      receiving identifying information from a detected wired endpoint connected to the network;
      issuing a command to the detected wired endpoint to cause the detected wired endpoint to transmit signals identifying the wired endpoint;
      receiving information from a communicating wireless endpoint, comprising one of the wireless endpoints, using wireless communication, including wireless endpoint identification information and information identifying at least one of the wired endpoints transmitting signals received at the wireless endpoint;
      determining position information for the wired endpoint indicated in the information received from the communicating wireless endpoint; and
      updating information on the communicating wireless endpoint to associate with the determined position information.

11. The system of claim 10, wherein the wired endpoints are connected to connection ports on the network, wherein the operations further comprise:
   determining from the connection port to which the detected wired endpoint is connected position information of the connection port; and
   updating the information on the detected wired endpoint for which the identifying information is received to associate with the determined position information for the connection port.

12. The system of claim 10, wherein the communicating wireless endpoint comprises a first wireless endpoint, wherein the operations further comprise:
   receiving identification from a second wireless endpoint that does not identify at least one of the wired endpoints for which information is maintained;
   determining position information for positions outside of a range in which the transmitted signals from the wired endpoints are receivable; and updating information on the second wireless endpoint to associate with the determined position information outside of the range in which the transmitted signals from the wired endpoints are not receivable.

13. The system of claim 12, wherein the wireless endpoints including the first and second wireless endpoints communicate within an access point range defined by an access point device, and wherein the wired endpoints are configured to operate as pseudo access points (PAPs), wherein the PAPs transmitted signals are receivable within PAP ranges within the range defined by the access point device, and wherein the position information outside of the range in which the transmitted signals from the PAPs are not receivable are within the access point range and outside of the PAP transmission ranges.

14. The system of claim 12, wherein the operations further comprise:
sending a notification to be rendered at the second wireless endpoint prompting a user to indicate actual position information of the second wireless endpoint;
receiving, in response to the notification, user entered actual position information; and
updating the information for the second wireless endpoint to associate with the received user entered actual position information.

15. The system of claim 10, wherein the information received from the communicating wireless endpoint includes measurement results from measuring a field intensity of received transmitted signals from the wired endpoints, wherein the operations further comprise:
determining from the measurement results one of the wired endpoints transmitting at a strongest intensity, wherein the determined position information of the wired endpoint associated with the communicating wireless endpoint comprises the position information from the wired endpoint transmitting at the strongest intensity.

16. The system of claim 10, wherein the operations further comprise:
using the information on the wireless endpoints to determine locations where wireless endpoints are congregating and where there are no wireless endpoints; and
using information on the determined locations where wireless endpoints are congregating and where there are no wireless endpoints to adjust electricity supplied to the determined locations to conserve electricity.

17. A computer implemented method for communicating with wireless endpoints and wired endpoints in a network, comprising:
maintaining, by a processor, information on the wired endpoints transmitting signals identifying the wired endpoints and including position information for the wired endpoints;
receiving, by the processor, identifying information from a detected wired endpoint connected to the network;
issuing a command, by the processor, to the detected wired endpoint to cause the detected wired endpoint to transmit signals identifying the wired endpoint;
receiving, by the processor, information from a communicating wireless endpoint, comprising one of the wireless endpoints, using wireless communication, including wireless endpoint identification information and information identifying at least one of the wired endpoints transmitting signals received at the wireless endpoint;
determining, by the processor, position information for the wired endpoint indicated in the information received from the communicating wireless endpoint; and
updating, by the processor, information on the communicating wireless endpoint to associate with the determined position information.

18. The method of claim 17, wherein the wired endpoints are connected to connection ports on the network, further comprising:
determining from the connection port to which the detected wired endpoint is connected position information of the connection port; and
updating the information on the detected wired endpoint for which the identifying information is received to associate with the determined position information for the connection port.

19. The method of claim 17, wherein the communicating wireless endpoint comprises a first wireless endpoint, further comprising:
receiving identification from a second wireless endpoint that does not identify at least one of the wired endpoints for which information is maintained;
determining position information for positions outside of a range in which the transmitted signals from the wired endpoints are receivable; and
updating information on the second wireless endpoint to associate with the determined position information outside of the range in which the transmitted signals from the wired endpoints are not receivable.

20. The method of claim 19, wherein the wireless endpoints including the first and second wireless endpoints communicate within an access point range defined by an access point device, and wherein the wired endpoints are configured to operate as pseudo access points (PAPs), wherein the PAPs transmitted signals are receivable within PAP ranges within the range defined by the access point device, and wherein the position information outside of the range in which the transmitted signals from the PAPs are not receivable are within the access point range and outside of the PAP transmission ranges.

21. The method of claim 19, further comprising:
sending a notification to be rendered at the second wireless endpoint prompting a user to indicate actual position information of the second wireless endpoint;
receiving, in response to the notification, user entered actual position information; and
updating the information for the second wireless endpoint to associate with the received user entered actual position information.

22. The method of claim 17, wherein the information received from the communicating wireless endpoint includes measurement results from measuring a field intensity of received transmitted signals from the wired endpoints, wherein the operations further comprise:
determining from the measurement results one of the wired endpoints transmitting at a strongest intensity, wherein the determined position information of the wired endpoint associated with the communicating wireless endpoint comprises the position information from the wired endpoint transmitting at the strongest intensity.

23. The method of claim 17, further comprising:
using the information on the wireless endpoints to determine locations where wireless endpoints are congregating and where there are no wireless endpoints; and
using information on the determined locations where wireless endpoints are congregating and where there are no wireless endpoints to adjust electricity supplied to the determined locations to conserve electricity.

* * * * *